US012219503B2

(12) United States Patent
Zhao et al.

(10) Patent No.: US 12,219,503 B2
(45) Date of Patent: Feb. 4, 2025

(54) INFORMATION TRANSMISSION METHOD AND APPARATUS, AND STORAGE MEDIUM

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 356 days.

(21) Appl. No.: 17/554,809

(22) Filed: Dec. 17, 2021

(65) Prior Publication Data

US 2022/0110075 A1    Apr. 7, 2022

Related U.S. Application Data

(63) Continuation of application No. PCT/CN2019/094929, filed on Jul. 5, 2019.

(51) Int. Cl.
*H04W 52/38* (2009.01)
*H04W 52/24* (2009.01)
*H04W 52/36* (2009.01)

(52) U.S. Cl.
CPC ....... *H04W 52/383* (2013.01); *H04W 52/242* (2013.01); *H04W 52/367* (2013.01)

(58) Field of Classification Search
CPC ......... H04W 52/00–60; H04W 52/242; H04W 52/383; H04W 52/367
See application file for complete search history.

(56) References Cited

U.S. PATENT DOCUMENTS

| 10,231,187 | B1 | 3/2019 | Rubin et al. |
| 2014/0126417 | A1* | 5/2014 | Kang .............. H04W 8/005 |
| | | | 370/254 |
| 2018/0279319 | A1* | 9/2018 | Yu ................ H04W 40/12 |
| 2018/0368174 | A1* | 12/2018 | Jeon ............. H04W 72/044 |

(Continued)

FOREIGN PATENT DOCUMENTS

| CN | 108322414 A | 7/2018 |
| CN | 108923894 A | 11/2018 |

OTHER PUBLICATIONS

International Search Report (ISR) dated Jul. 5, 2019 for Application No. PCT/CN2019/094929.

(Continued)

*Primary Examiner* — Raymond S Dean
(74) *Attorney, Agent, or Firm* — Ladas & Parry LLP

(57) ABSTRACT

Embodiments of the present application provide an information transmission method and apparatus, and a storage medium, where the method includes: sidelink data transmitted by a second terminal device to at least two first terminal devices carries indication information, where the indication information is used to determine a target transmitting power of feedback information corresponding to the sidelink data, so that each first terminal device can determine the target transmitting power of the feedback information based on the indication information, and transmit the feedback information to the second terminal device with the target transmitting power.

4 Claims, 9 Drawing Sheets

(56) References Cited

U.S. PATENT DOCUMENTS

2019/0052436 A1    2/2019  Desai et al.
2020/0112400 A1*  4/2020  Lee ........................ H04L 1/1819
2021/0084656 A1*  3/2021  Feng ................. H04W 74/0816
2021/0136694 A1*  5/2021  Gao .................... H04W 52/245

OTHER PUBLICATIONS

OPPO:"Discussion of sidelink unicast, groupcast and broadcast for NR-V2X" 3GPP TSG RAN WG1 Meeting #94 R1-1808875 Aug. 24, 2018.

* cited by examiner

INFORMATION TRANSMISSION METHOD AND APPARATUS, AND STORAGE MEDIUM

CROSS-REFERENCE TO RELATED APPLICATION

This application is a continuation of International Application No. PCT/CN2019/094929, filed on Jul. 5, 2019, which is hereby incorporated by reference in its entirety.

TECHNICAL FIELD

Embodiments of the present application relate to the field of communication technologies, in particular, to an information transmission method and apparatus, and a storage medium.

BACKGROUND

A device to device (Device to Device, D2D) system can provide services such as proximity based services (proximity based services, ProSe), Internet of Vehicles (V2X), and wearable devices (FeD2D). Where an Internet of Vehicles system is formed based on a device-to-device D2D sidelink (Sidelink, SL) transmission technology, which adopts device-to-device direct communication, and has higher spectrum efficiency and lower transmission delay.

In prior art, for a scenario that require high communication reliability, such as new radio Internet of Vehicles NR-V2X, a feedback channel is introduced on the sidelink in order to improve transmission reliabilities. In a communication group, after a certain terminal in the communication group (for example, called a transmitting terminal) transmits sidelink data to other terminals in the communication group (called receiving terminals), each receiving terminal in the communication group can transmit feedback information to the transmitting terminal according to a detection result of the received sidelink data, so that the transmitting terminal determines whether to retransmit the transmitted sidelink data according to the received feedback information.

However, since a terminal usually uses a maximum transmitting power to transmit the feedback information, when feedback information transmitted by multiple receiving terminals of the same communication group arrives at the transmitting terminal at the same time, feedback information of the receiving terminal which is closer to the transmitting terminal may cover feedback information of the receiving terminal which is farther away from the transmitting terminal, which causes that the transmitting terminal fails to detect the feedback information of the farther receiving terminal, and thus leads to a problem of failure in detection of the feedback information.

SUMMARY

Embodiments of the present application provide an information transmission method and apparatus, and a storage medium, which solves a problem of failure in detection of feedback information caused by the fact that feedback information of a receiving terminal which is closer to a transmitting terminal may cover feedback information of a receiving terminal which is farther away from the transmitting terminal.

In a first aspect, an embodiment of the present application provides an information transmission method applied to a first terminal device, and the method includes:
  receiving sidelink data transmitted by a second terminal device, where the sidelink data carries indication information, and the indication information is used to determine a target transmitting power of feedback information corresponding to the sidelink data;
  determining the target transmitting power of the feedback information according to the indication information; and
  transmitting the feedback information to the second terminal device with the target transmitting power.

In a second aspect, an embodiment of the present application provides an information transmission method applied to a second terminal device, and the method includes:
  transmitting sidelink data to at least two first terminal devices, where the sidelink data carries indication information, and the indication information is used to determine a target transmitting power of feedback information corresponding to the sidelink data; and
  receiving feedback information transmitted by the at least two first terminal devices.

In a third aspect, an embodiment of the present application provides an information transmission method applied to a first terminal device, and the method includes:
  receiving sidelink data transmitted by a second terminal device;
  determining a target channel resource of feedback information corresponding to the sidelink data; and
  transmitting the feedback information to the second terminal device according to the target channel resource.

In a fourth aspect, an embodiment of the present application provides an information transmission apparatus, the apparatus is applied to a first terminal device, and the apparatus includes: a receiving module, a processing module, and a transmitting module;
  the receiving module is configured to receive sidelink data transmitted by a second terminal device, where the sidelink data carries indication information, and the indication information is used to determine a target transmitting power of feedback information corresponding to the sidelink data;
  the processing module is configured to determine the target transmitting power of the feedback information according to the indication information; and
  the transmitting module is configured to transmit the feedback information to the second terminal device with the target transmitting power.

In a fifth aspect, an embodiment of the present application provides an information transmission apparatus applied to a second terminal device, and the apparatus includes: a transmitting module, a processing module, and a receiving module;
  the transmitting module is configured to transmit sidelink data to at least two first terminal devices, where the sidelink data carries indication information, and the indication information is used to determine a target transmitting power of feedback information corresponding to the sidelink data; and
  the processing module is configured to receive, through the receiving, module feedback information transmitted by the at least two first terminal devices.

In a sixth aspect, an embodiment of the present application provides an information transmission apparatus, where the apparatus is applied to a first terminal device, and the apparatus includes: a receiving module, a processing module, and a transmitting module;

the receiving module is configured to receive sidelink data transmitted by a second terminal device;

the processing module is configured to determine a target channel resource of feedback information corresponding to the sidelink data; and the transmitting module is configured to transmit the feedback information to the second terminal device according to the target channel resource.

In a seventh aspect, an embodiment of the present application provides an information transmission apparatus, including:

a processor, a memory, a receiver, a transmitter, and an interface for communicating with a network device;

the memory stores computer-executable instructions;

the processor executes computer-executable instructions stored in the memory, and causes the processor executes the method described in the first aspect above.

In an embodiment, the processor above may be a chip.

In an eighth aspect, an embodiment of the present application provides an information transmission apparatus, including:

a processor, a memory, a receiver, a transmitter, and an interface for communicating with a user equipment:

the memory stores computer-executable instructions;

the processor executes the computer-executable instructions stored in the memory, and causes the processor executes the method described in the second aspect above.

In an embodiment, the processor above may be a chip.

In a ninth aspect, an embodiment of the present application provides an information transmission apparatus, including:

a processor, a memory, a receiver, a transmitter, and an interface for communicating with a network device:

the memory stores computer-executable instructions;

the processor executes the computer-executable instructions stored in the memory, and causes the processor executes the method described in the third aspect.

In an embodiment, the processor above may be a chip.

In a tenth aspect, an embodiment of the present application may provide a computer-readable storage medium, the computer-readable storage medium stores computer-executable instructions, and when the computer-executable instructions are executed by a processor, the method described in the first aspect is implemented.

In an eleventh aspect, an embodiment of the present application may provide a computer-readable storage medium, the computer-readable storage medium stores computer-executable instructions, and when the computer-executable instructions are executed by a processor, the method described in the second aspect is implement.

In a twelfth aspect, an embodiment of the present application may provide a computer-readable storage medium, the computer-readable storage medium stores computer-executable instructions, and when the computer-executable instructions are executed by a processor, the method described in the third aspect is implemented.

In a thirteenth aspect, an embodiment of the present application provides a program, when the program is executed by a processor, the method described in the first aspect is executed.

In a fourteenth aspect, an embodiment of the present application provides a program, when the program is executed by a processor, the method described in the second aspect is executed.

In a fifteenth aspect, an embodiment of the present application provides a program, when the program is executed by a processor, the method described in the third aspect is executed.

In a sixteenth aspect, an embodiment of the present application provides a computer program product including program instructions, and the program instructions are used to implement the method described in the First aspect.

In a seventeenth aspect, an embodiment of the present application provides a computer program product including program instructions, and the program instructions are used to implement the method described in the second aspect.

In an eighteenth aspect, an embodiment of the present, application provides a computer program product including program instructions, and the program instructions are used to implement the method described in the third aspect.

In a nineteenth aspect, an embodiment of the present application provides a chip including a processing module and a communication interface, and the processing module can execute the method described in the first aspect.

Further, the chip further includes a memory module (such as a memory), the memory module is used to store instructions, the processing module is used to execute the instructions stored in the memory module, and execution of the instructions stored in the memory module causes the processing module to execute the method described in the first aspect.

In a twentieth aspect, an embodiment of the present application provides a chip including a processing module and a communication interface, and the processing module can execute the method described in the second aspect.

Further, the chip also includes a memory module (such as a memory), the memory module is used to store instructions, the processing module is used to execute the instructions stored in the memory module, and execution of the instructions stored in the memory module causes the processing module to execute the method described in the second aspect.

In a twenty-first aspect, an embodiment of the present application provides a chip including a processing module and a communication interface, and the processing module can execute the method described in the third aspect.

Further, the chip also includes a memory module (such as a memory), the memory module is used to store instructions, the processing module is used to execute the instructions stored in the memory module, and execution of the instructions stored in the memory module causes the processing module to execute the method described in the third aspect.

A twenty-second aspect of the present: application provides a communication system, including: a first terminal device and a second terminal device;

the first terminal device is the apparatus described in the fourth aspect above, and the second terminal device is the apparatus described in the fifth aspect above; or the first terminal device is the apparatus described in the sixth aspect.

In an embodiment, the communication system may further include: a network device, which is configured to provide services for the first terminal device and/or the second terminal device.

According to the information transmission method and apparatus, and the storage medium provided by embodiments of the present application, sidelink data transmitted by a second terminal device to at least two first: terminal devices carries indication information, and the indication information is used to determine a target transmitting power of feedback information for performing feedback of the sidelink data, in this way, each first terminal device can determine the target transmitting power of the feedback information based on the indication information, and transmit the feedback information to the second terminal device with the target transmuting power, that is, in the technical solution, powers of the feedback information transmitted by each first terminal device reaching the second terminal device are caused to be similar, thereby avoiding a problem of failure in detection of feedback information caused by the fact that feedback information of a receiving terminal which is closer to a transmitting terminal may cover feedback information of a receiving terminal which is farther away from the transmitting terminal.

DESCRIPTION OF EMBODIMENTS

Figure 1:
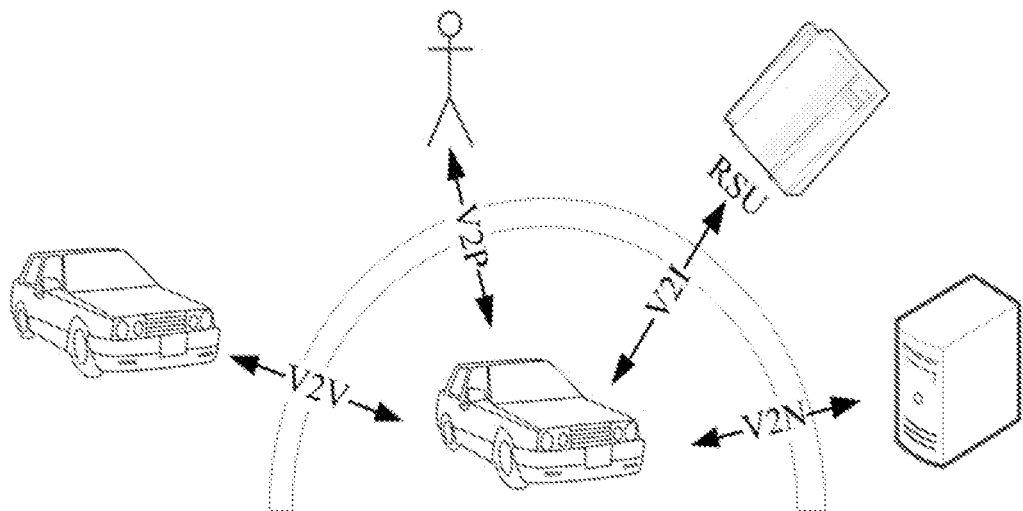
FIG. 1 is a schematic diagram, of V2X communication architecture.

The technical solutions in embodiments of the present application will be described clearly and completely in the following with reference to accompanying drawings in the embodiments of the present application to make the purpose, technical solutions and advantages of the embodiments of the present application clearer, Obviously, the described embodiments are a part of the embodiments of the present application, but not all of the embodiments. All other embodiments obtained by those of ordinary skill in the art based on the embodiments of the present application without paying creative work shall fall within the protection scope of the present application.

The terms "first", "second", etc, in the description, claims, and the above drawings of the embodiments of the present application are used to distinguish similar objects, and are not necessarily used to describe a specific order or sequence. It should be understood that data used in this way can be interchanged under appropriate circumstances, so that the embodiments of the present application described herein can be implemented in a sequence other than those shown or described herein. In addition, the terms "include" and "have" and any variations thereof are intended to cover non-exclusive inclusions. For example, processes, methods, systems, products, or devices that include a series of steps or units are not necessarily limited to those steps or units clearly listed, but may include other steps or units that are not clearly listed or are inherent to these processes, methods, products, or devices.

With the development of network technologies and intelligent vehicle technologies, more and more attention has been paid to Internet of Vehicles. An Internet of Vehicles system is a sidelink transmission technology based ore. D2D, which is different from a traditional LTE system where communication data is received or transmitted through a base station. The Internet of Vehicles system adopts terminal-to-terminal direct communication, which has higher Spectrum efficiency and lower transmission delay.

In a third generation partnership project (3rd generation partnership project, 3GPP), research on D2D is divided into different stages which are shown in the following.

Proximity based services (proximity based services, ProSe): mainly used to improve spectrum utilization and reduce loads of a base station. Specifically, a terminal communicates directly through spectrum resources allocated by a base station, thereby improving utilization of wireless spectrum resources. After proximity based services between terminals are successfully established, device-to-device communication can be performed, and the loads of the base station can be reduced, which is mainly for public security services.

Internet of Vehicles (V2X): researches on scenarios of vehicle-to-vehicle communication are conducted in the Internet of Vehicles system, which is mainly oriented to services of vehicle-to-vehicle, vehicle-to-person communication with a relatively high moving speed.

Wearable devices (FeD2D): mainly used in scenarios where wearable devices access a network through mobile terminals, which is mainly oriented to scenarios where accessing is performed with a low moving speed and a low power.

In the following, a schematic diagram of V2X communication architecture will be introduced briefly.

At present, in an Internet of Vehicles communication system, an Internet of Vehicles terminal realizes interaction of intelligent information between a vehicle and X (a vehicle, a person, a traffic infrastructure and a network) through the vehicle-to-everything (vehicle-to-everything, V2X) technology. Interaction modes of V2X, communication include: vehicle to vehicle (vehicle to vehicle, V2V), vehicle to infrastructure (vehicle to infrastructure, V2I), vehicle to pedestrian (vehicle to pedestrian, V2P), vehicle to network (vehicle to network, V2N). Exemplarily, the infrastructure may be a roadside unit (road side unit, R.S13), FIG. 1 is a schematic diagram of V2X communication architecture. As shown in FIG. 1. V2X communication includes V2V communication, V2P communication, V2I communication, and V2N communication. During a V2X communication procedure, V2X services are transmitted through a sidelink (sidelink) or a Uu port.

In actual applications, V2X realizes typical application scenarios such as information services, traffic safety, and traffic efficiency with the help of omni-directional connections and efficient information interaction with people, vehicles, roads, and cloud platforms. An Internet of Vehicles terminal can acquire various kinds of information services through V2I and V2N communication, including traffic signal information, vehicle information in nearby areas, vehicle navigation, emergency rescue, and infotainment services information such as speeds, locations, driving conditions and pedestrian activities of surrounding vehicles can be acquired through V2V and V2P communication in real time, and a collision warning function can be realized through intelligent algorithms to avoid traffic accidents. Through V2I communication, functions such as vehicle speed guidance can be realized, and traffic efficiency can be improved.

With the continuous development of technology, a new radio (new radio, NR) communication system is currently being introduced, V2X in the NR system is called NR-V2X. In the following, application scenarios of NR-V2X will be illustrated.

In an NR-V2X system, it is necessary to support automatic driving. Therefore, higher requirements are put forward for data interaction between vehicle-mounted terminals, such as higher throughput, lower delay, higher reliability, and larger coverage, more flexible resource allocation, etc.

In the NR-V2X system, communication over sidelinks is called a V2X sidelink communication mode. In this communication mode, the vehicle-mounted terminal can work in a scenario with or without network coverage.

In the scenario with network coverage, the V2X sidelink communication mode is further divided into a centralized scheduling transmission mode and a distributed transmission mode.

In the centralized scheduling transmission mode, transmission resources for transmitting V2X services on a sidelink by a terminal device are allocated by a network device, which is called Mode 1 in the NR-V2X system, also called as mode 1; in the distributed transmission mode, a network device configures a V2X sidelink resource pool. Whenever transmitting a V2X service, a terminal device acquires resources from the resource pool configured on a network without scheduling by the network device. This mode is called Mode 2 in the NR-V2X system, also called as mode 2. Reference may be made to the description of a schematic diagram shown in FIG. 2 and FIG. 3 for details.

Figure 2:
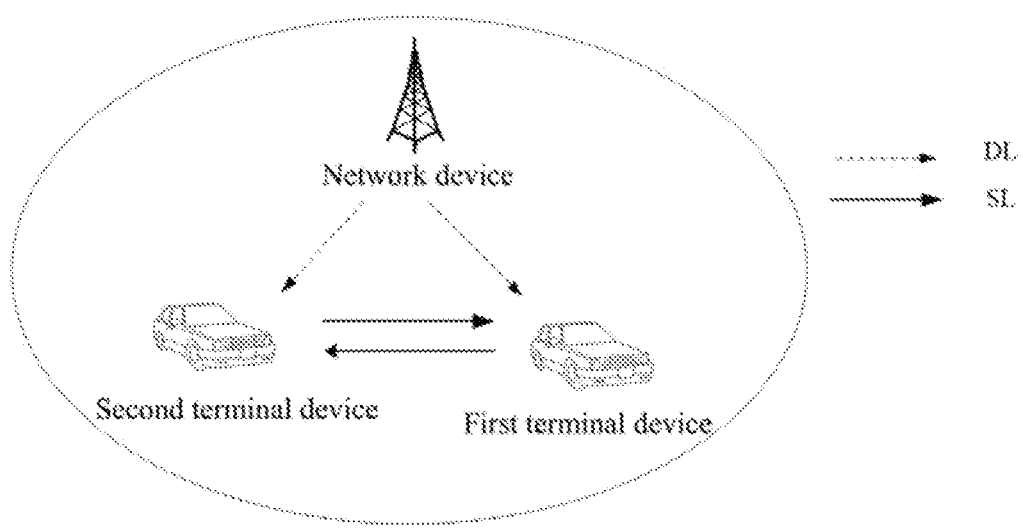
FIG. 2 is a schematic diagram of system architecture applicable to Mode 1.
Figure 3:
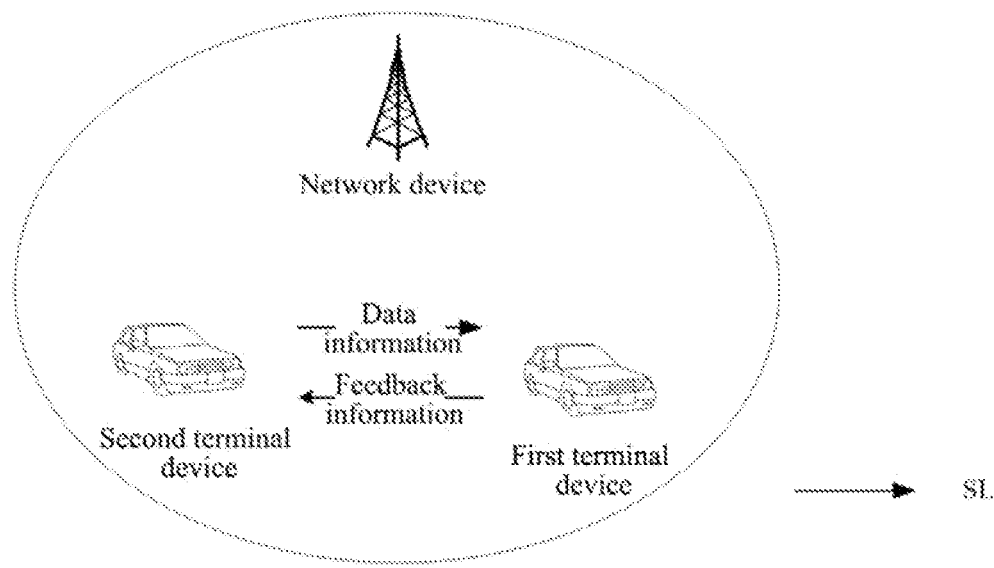
FIG. 3 is a schematic diagram of system architecture applicable to Mode 2.

FIG. 2 is a schematic diagram of system architecture applicable to Mode 1. FIG. 3 is a schematic diagram of system architecture applicable to Mode 2. Refer to FIG. 2 and FIG. 3, a first terminal device and a second terminal device are terminal devices with V2X communication capabilities for performing V2X communication. The first terminal device and the second terminal device perform V2X communication through a wireless communication interface, and the first terminal device and the network device, or the second terminal device and the network device perform communication through wireless communication interfaces. For clarity, the wireless communication interface between the first terminal device and the second terminal device is referred to as a first air interface. The first air interface is, for example, a sidelink, and the wireless communication interface between the first terminal device and the network device or the wireless communication interface between the second terminal device and the network is called a second air interface, and the second air interface is, for example, a Uu interface.

Refer to FIG. 2, as an example, a transmission resource for the first terminal device and the second terminal device is allocated by the network device, and the first terminal device and the second terminal device perform data transmission on a sidelink according to the resource allocated by the network device; the network device can allocate a resource for a single transmission to the first terminal device and the second terminal device, or allocate a resource for semi-static transmission to the first terminal device and the second terminal device, which will not be repeated herein.

Refer to FIG. 3, as another example, the first terminal device and the second terminal device may select a resource in a resource pool to perform data transmission, Specifically, the first terminal device and the second terminal device may select a transmission resource from the resource pool by means of listening, or select the transmission resource from the resource pool by means of random selection. Regarding a method for selecting the transmission resource by the first terminal device and the second terminal device can be determined according to actual situations, which will not be repeated herein.

In a scenario without network coverage, the terminal device uses the above Mode 2 for transmission. At this time, the resource pool is acquired by means of pre-configuration. Specific transmission method is the same as the above Mode 2, which will not be repeated herein.

Furthermore, in NR-V2X, in order to improve transmission reliability, a feedback channel is introduced on the sidelink. As shown in FIG. 2 and FIG. 3, the first terminal device (for example, UE1) and the second terminal device (For example, UE2) constitute a unicast link, UE1 transmits sidelink data to UE2, and UE2 transmits feedback information to UE1 according to a detection result of the received sidelink data. Exemplarily, the feedback information may be an hybrid automatic repeat request (hybrid automatic repeat request, HA RQ ACK) or HARQ non-acknowledgement (HARQ NACK).

UE1 determines, according to the received feedback information of UE2, whether to retransmit data which has been transmitted to U E2.

It is worth noting that feedback information between terminal devices is also applicable to multicast communication. In a communication group, when a terminal transmits multicast information, other terminals in the group transmit the feedback information to a transmitting end according to status of the received data.

Exemplarily, for a multicast communication mode, content of the feedback information may include the following two modes: only feedback. HARQ NACK, feedback HARQ ACK or HARQ NACK. The specific analysis is shown in the following.

Mode 1: only feedback HARQ NACK. That is, only receiving terminals (for example, UE2 to UE4) which are within a certain distance from a transmitting terminal (for example, UE1) and fail to receive a physical sidelink shared Channel (physical sidelink shared channel, PSSCH) correctly, that is, only the receiving terminals that need to feedback HARQ NACK transmit feedback information; further, all receiving terminals that need to transmit HARQ N ACK use the same transmission resource to transmit the feedback information.

Mode 2: feedback HARQ ACK or HARQ NACK. If a receiving terminal in the communication group receives the PSSCH correctly, then the receiving terminal transmits HARQ ACK and if the receiving terminal does not receive the PSSCH correctly, then the receiving terminal transmits HARQ NACK. Further, different receiving terminals use different transmission resources to transmit feedback information, where different transmission resources include different time domain resources, frequency domain resources or code domain resources.

Figure 4:
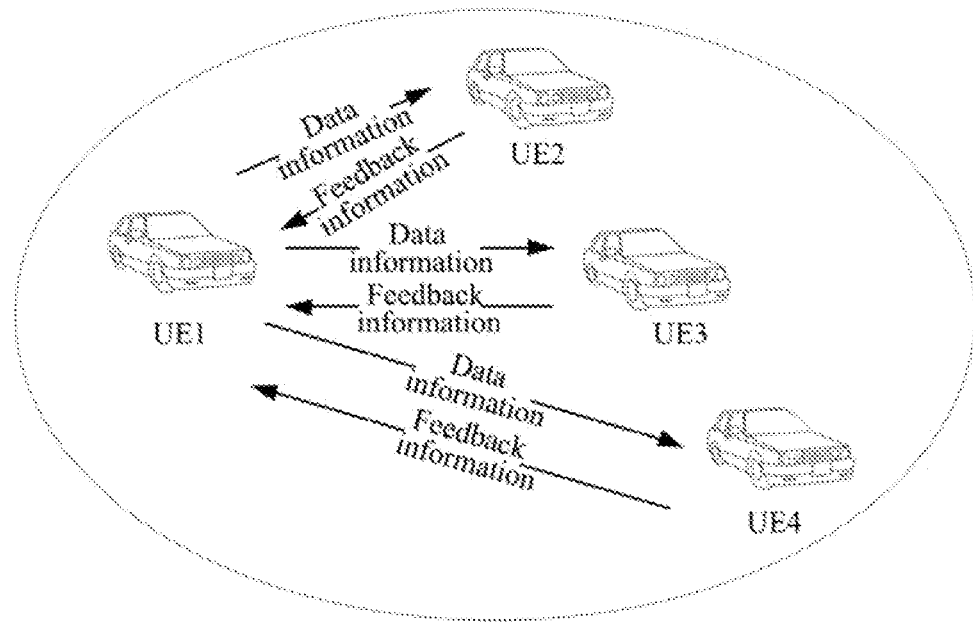
FIG. 4 is a schematic diagram of information transmission between terminal devices in a communication group.
Figure 5:
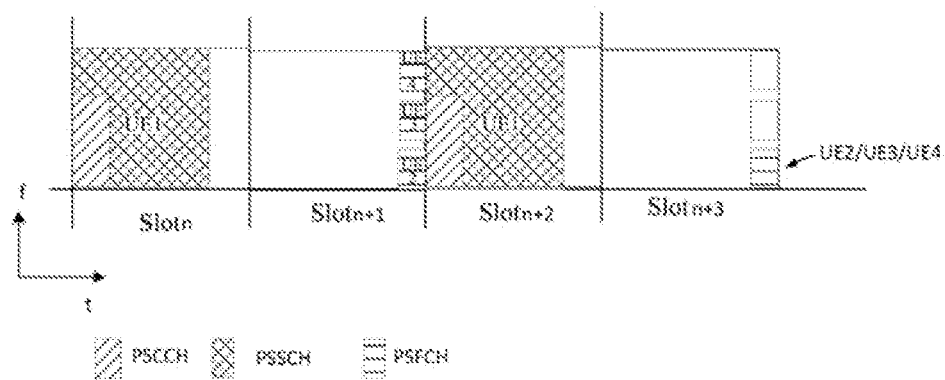
FIG. 5 is a schematic diagram of resource distribution for feedback information of terminal devices in a communication group.

Exemplarily. FIG. 4 is a schematic diagram of information transmission between terminal devices in a communication croup. FIG. 5 is a schematic diagram of resource distribution for feedback information of terminal devices in a communication group. As shown in FIG. 4, a communication group includes 4 terminal devices (UE1 to UE4). When UE1 transmits sidelink data, UE2, UE3, and UE4 are receiving ends of the dam, and transmit feedback information to the transmitting end UE1 according to whether data is received correctly.

As shown in FIG. 5, if UE1 transmits sidelink data through a physical sidelink control channel (physical sidelink control channel, PSCCH) and a physical sidelink shared channel (physical sidelink shared channel, PSSCH) in a time slot n, if Mode 2 is adopted, that is, each receiving terminal (UE2, UE3, UE4) needs to transmit feedback information HARQ ACK or HARQ NACK, then UE2, UE3, UE4 use different transmission resources to transmit feedback information to UE1 through a physical sidelink feedback channel (physical sidelink feedback channel, PSFCH) in a time slot n+1. If Mode 1 is adopted, that is, only the terminal (UE2 or UE3 or UE4) which needs to transmit HARQ NACK and is within a certain distance from UE1, needs to transmit feedback information.

In the embodiment, it is assumed that UE2, UE3, and UE4 are all within a distance range where the feedback information needs to be transmitted, and none of them receive the PSSCH correctly, that is, HARQ NACK needs to be fed back, then UE2, UE3, and UE4 use the same time-frequency resource to transmit the feedback information, as shown in a time slot n+3.

For feedback mode 2, UE1 needs to detect feedback information of each terminal (UE2, UE3, UE4) respectively to determine which terminals have received correctly and which terminals have not received correctly; for feedback mode 1, UE1 only needs to detect whether there are users who have led back NACK feedback resources, and there is no need to distinguish which users have fed back.

For feedback mode 2, since all feedback information needs to be detected, interference among multiple receiving terminals should be as low as possible to ensure detection performance. There may be a near-far effect problem in sidelink transmission, that is, signals of users who are close will cover signals of users who are far away, thereby rendering signals fed back by users who are far away undetectable.

Figure 6:
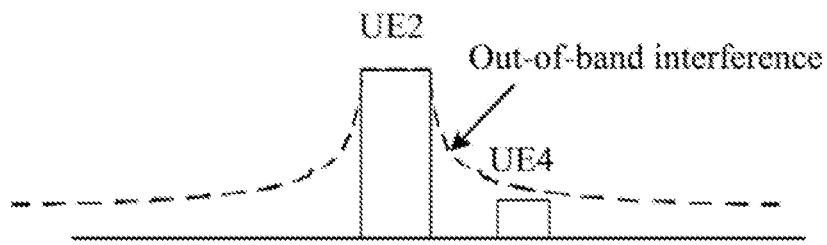
FIG. 6 is a schematic diagram of coverage of a near-far effect.

Exemplarily, FIG. 6 is a schematic diagram of coverage of a near-far effect. As shown in FIG. 6, when UE2, UE3, and UE4 all use a maximum transmitting power to transmit feedback information, since UE2 is close to UE1 and UE4 is farther away from UE1, energy of a signal of UE2 detected by UE1 is high, and energy of a signal of UE4 detected by UE1 is low. Energy of out-of-band interference caused by the signal of UE2 will be even higher than the energy of the signal of UE4 received by UE1, thereby leading to failure in detection of feedback information of UE4 by UE1.

In view of the above-mentioned problems, embodiments of the present application provide an information transmission method, by introducing sidelink power control in NR-V2X, sidelink data transmitted by a transmitting terminal (a second terminal device) to receiving terminals (at least two first terminal devices) carries indication information used to determine a target transmitting power of feedback information corresponding to the sidelink data, so that the receiving terminals can determine the target transmitting power of the feedback information based on the indication information, and transmit feedback information to the second terminal device with the target transmitting power, thus enabling the second terminal device to receive feedback information transmitted by each first terminal device, thereby solving a problem of failure in detection of the feedback information caused by the fact that the feedback information of the receiving terminal which is closer to the transmitting terminal may cover the feedback information of the receiving terminal which is farther away from the transmitting terminal.

The information transmission method provided in the embodiments of the present application can be used in the 3rd generation mobile communication (the 3rd generation mobile communication, 3G), a long term evolution (long term evolution, LITE) system, and the 4th generation mobile communication (the 4th generation mobile communication, 4G) system, an advanced long term evolution system (advanced long term evolution, LTE-A), a cellular system related to the 3rd veneration partnership project (the 3rd generation partnership project, 3GPP), the 5th veneration mobile communication (the 5th generation mobile communication, 5G) system and a subsequent evolution of a communication system.

The information transmission method provided in the embodiments of the present application can be used in an Internet. of Vehicles system, and can also be used in any D2D systems.

The network device involved in the embodiments of the present application may be a common base station (such as a NodeB or eNB gNB), a new radio controller (new radio controller, NR controller), a centralized unit (centralized unit), a new radio base station, a remote radio module, a micro base station, a relay (relay), a distributed unit (distributed unit) a transmission reception point (transmission reception point, TRP), a transmission point (transmission point, TP) or any other device, but the present application is not limited thereto.

The terminal device related to the embodiments of the present application, such as the first terminal device or the second terminal device, is a terminal device with V2X communication capabilities, and is a device that provides users with voice and/or data connectivity, for example, a handheld device, a vehicle-mounted device, a road side unit or the like with wireless connectivity. Common terminal devices include: mobile phones, tablet computers, notebook computers, palmtop computers, mobile internet devices (mobile interact device, M1D), wearable devices, such as smart watches, smart bracelets, pedometers, etc.

The technical solution of the present application will be described in detail below through specific embodiments it should be noted that following specific embodiments can be combined with each other, and same or similar concepts or processes may not be repeated in some embodiments.

Figure 7:
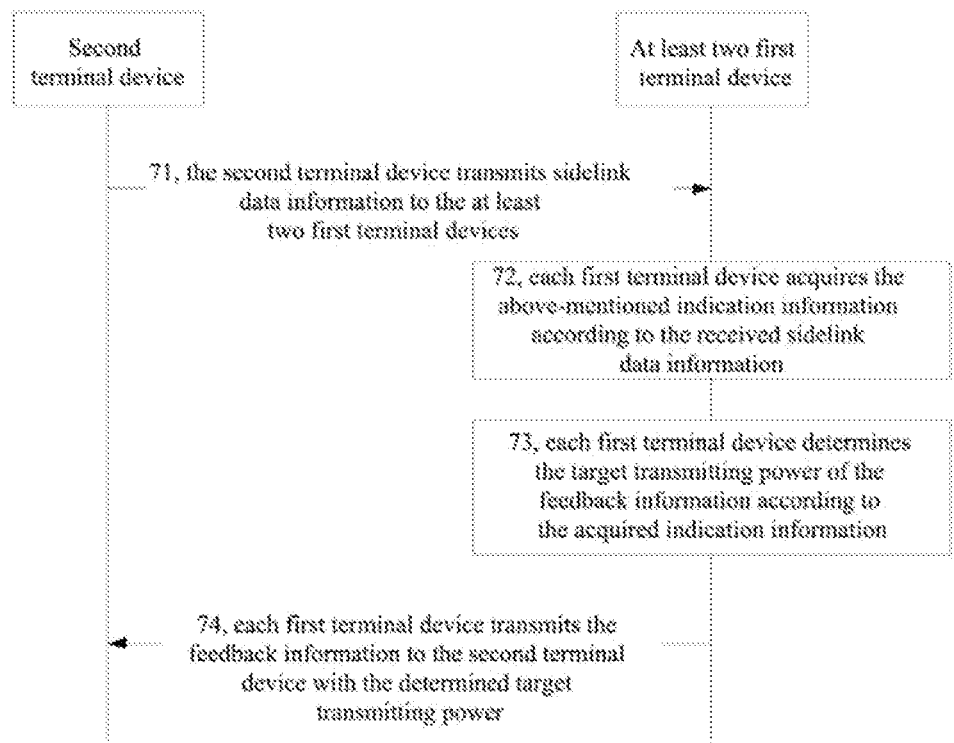
FIG. 7 is an interaction schematic diagram of Embodiment 1 of an information transmission method provided by an embodiment of the present application.

FIG. 7 is an interaction schematic diagram of Embodiment 1 of an information transmission method provided by an embodiment of the present application. Exemplarily, for the purpose of description, in the embodiment, a second terminal device communicates with at least two first terminal devices through sidelinks. Where each of the at least two first terminal devices can receive sidelink data transmitted by the second terminal device. It should be noted that the embodiment can be applied to a situation where there is only one first terminal device.

Exemplarily, as shown in FIG. 7, in the embodiment, the information transmission method may include following steps:

step 71: the second terminal device transmits sidelink data to the at least two first terminal devices, where the sidelink data carries indication information, and the indication information is used to determine a target transmitting power of feedback information corresponding to the sidelink data.

In the embodiment, in a communication group, when the second terminal device needs to communicate with multiple first terminal devices in the communication group through the sidelink, the second terminal device can transmit sidelink data to other terminal devices in the communication group by virtue of multicast.

Exemplarily, in the embodiment, the second terminal device is a vehicle-mounted terminal device used to transmit the sidelink data in the communication group, for example, UE1 in FIG. 4, and the at least two first terminal devices are vehicle-mounted terminal devices used to receive the sidelink data in the communication group, for example, UE2 to UE4 in FIG. 4.

It is worth noting that, in the embodiment of the present application, the first terminal device and the second terminal device are only for the purpose of distinguishing a transmitting end and a receiving end with respect to the transmission of the sidelink data, which do not indicate an order and a precedence relationship.

Exemplarily, in the embodiment, the second terminal device transmits control information through a physical sidelink control channel (physical sidelink control channel, PSCCH), and transmits data information through a physical sidelink shared channel (physical sidelink shared channel, PSSCH). Therefore, the sidelink data described in the embodiments of the present application may include the control information transmitted through the PSCCH and the data information transmitted through the PSSCH.

In an embodiment, when the second terminal device transmits the sidelink data to the first terminal device, the indication information may be carried in the sidelink data, so that each first terminal device that receives the sidelink data can determine the target transmitting power of the feedback information corresponding to the sidelink data according to the indication information.

Exemplarily, the indication information may be carried in sidelink control information (sidelink control information. SCI) carried by the PSCCH.

In the embodiments of the present application, after the second terminal it) device transmits the sidelink data to the at least two first terminal devices, each first terminal device can receive the sidelink data carrying the indication information transmitted by the second terminal device.

In a possible design of the present application, the indication information includes first information, and the first information is used to determine a transmitting power of the second terminal device.

In the embodiment, the indication information carried in the sidelink data includes the first information. For example, the SCI of the sidelink data includes the first information, so that the second terminal device can transmit the first information to each first terminal device by transmitting the sidelink data, so that each first terminal device can acquire the first information in the SCI by analyzing the received sidelink data, thereby determining the transmitting power of the second terminal device.

Exemplarily, in the embodiment, the first information includes any one of the following items:

1. Quantitative power information of the transmitting power of the second terminal device.

In the embodiment, before the second terminal device transmits the sidelink data to the at least two first terminal devices, the transmitting power of the second terminal device is first quantized to obtain quantized power information, and then the quantized power information is included in the SCI and transmitted to the aforementioned at least two first terminal devices.

Exemplarily, under normal circumstances, a larger transmission resource is usually required for accurately describing a value of the transmitting power of the second terminal device. Therefore, in order to reduce the transmission resource occupied by the indication information, the transmitting power of the second terminal device can be quantified first, for example, 8 bit data bits are used to carry the quantized power information, and are then transmitted to the first terminal device.

2. A power level identifier corresponding to the transmitting power of the second terminal device.

In the embodiment, the power can be divided into multiple different levels, so that the second terminal device can determine a power level identifier corresponding to the transmitting power according to the transmitting power corresponding to the sidelink data transmitted to each first terminal device, and transmit the power level identifier to multiple first terminal devices by carrying the same in the SCI of the sidelink data. Correspondingly, each first terminal device determines the transmitting power of the second terminal device through detection of the received sidelink data and according to the power level identifier carried in the sidelink data.

Exemplarily, the first terminal device may determine the lowest power in a power range corresponding to a power level determined by the power level identifier as the transmitting power of the second terminal device; or, the first terminal device may determine an average value of powers or a median value of powers in the power range corresponding to the power level determined by the power level identifier as the transmitting power of the second terminal device.

3 A difference between the transmitting power of the second terminal device and a first power.

Where the first power is in any one of the following forms: a maximum transmitting power of the second terminal device, a pre-configured power value, and a power value determined by the second terminal device.

In the embodiment, the second terminal device may also use the first power known by the second terminal device, or derived and calculated by the second terminal device, to transmit the difference between the transmitting power for transmitting the sidelink data and the first power to multiple first terminal devices by carrying the same in the sidelink data.

In an embodiment, the second terminal device quantizes the difference, and carries the quantized information in the sidelink data and transmits the same to the multiple first terminal devices.

In practical applications, the first power can be the maximum transmitting power of the second terminal device, or the pre-configured power value, or the power value determined by the second terminal device. A specific expression form of the first power is not limited in the embodiments of the present application, which can be determined according to actual situations.

As an example, in an application scenario, the maximum transmitting power of the second terminal device may be 23 dBm, and in another application scenario, the maximum transmitting power of the second terminal device may also be 26 dBm. A specific value of the maximum transmitting power of the second terminal device is not limited in the embodiments of the present application, which can be determined according to actual situations, and will not be repeated herein.

As another example, the pre-configured power value may be a pre-defined power value negotiated by terminals in a communication group or determined by a network device, for example, 23 dBm. The pre-configured power value is not limited either in the embodiments of the present application.

As another example, the first power may also be a power value independently determined by the second terminal device, for example, a power value determined according to parameter information carried in the SCI.

In an embodiment, the first power may be a threshold value determined according to priority information in the SCE, for example, a threshold value of a reference signal receiving power determined according to a proSe per-packet priority (ProSe Per-Packet Priority, PPPP).

In an embodiment, the first power may also be a power value determined according to reliability index information, delay information, or quality of service (quality of service, QoS),etc, in the SCI, and a specific implementation of determining the first power by the second terminal device is not limited in the embodiments of the present application.

Exemplarily, the first terminal device acquires the first information according to network configuration in formation or pre-configuration information, and the first information is used to determine the transmitting power of the second terminal device.

Exemplarily, the pre-configuration information indicates each terminal to transmit the sidelink data at the maximum transmitting power (for example, 23 dBm) or, for example, a network transmits configuration information, indicating a terminal to transmit the sidelink data with a fixed transmitting power (for example, 23 dBm). The first terminal device can determine the transmitting power of the second terminal device according to the pre-configuration information or the configuration information from the network.

In another possible design of the present application, the indication information includes second information, and the second information is used to determine a target receiving power of the second terminal device.

In an embodiment, the target receiving power is determined by the second terminal device and transmitted to the first terminal device. Specifically, the second terminal device transmits the second information to the first terminal device through the SCI.

In an embodiment, the target receiving power is acquired from a network side. When a network device allocates a sidelink transmission resource to the second terminal device, the network device can indicate, through downlink control information (downlink control information, DCI) signaling or RRE signaling, the target receiving power when receiving feedback information by the second terminal device.

For dynamic resource allocation, the network device indicates, through DCI signaling, the target receiving power when receiving the feedback information by the second terminal device; for configured grant. (Configured Grant) resource allocation, the network device indicates, through DCI signaling or RRC signaling, the target receiving power when receiving the feedback information by the second terminal device.

Therefore, in the embodiment, after the network device transmits the second information for determining the target receiving power of the second terminal device to the second terminal device, when transmitting the sidelink data to the first terminal device, the second terminal device can transmit the received second information to the first terminal device, for example, through the SCI.

In another possible design of the present application, the target receiving power of the second terminal device may be configured by the network or pre-configured. In an embodiment, the network device may configure a target receiving power value of each terminal device in a communication group. For example, the network device configures, through radio resource control (radio resource control, RRC) signaling, a target receiving power expected to be received for each terminal device in the communication group.

In the embodiment, each first terminal device can directly receive the second information used to determine the target receiving power of the second terminal device from the network device, and the second terminal device does not need to perform transmission, thereby reducing signaling between terminal devices.

Exemplarily, in another possible design of the present application, the method may further include the following steps:

each first terminal device receives configuration information of a resource pool transmitted by a network device, where the configuration information of the resource pool includes second information, and the second information is used to determine a target receiving power of the second terminal device.

In the embodiment, after the network device configures the resource pool for a communication group, the network device can transmit configuration information of the resource pool to each terminal device in the communication group, and carry the target receiving power of each terminal device in the configuration information of the resource pool. Therefore, in the embodiment, when detecting the sidelink data (PSCCH and/or PSSCH) transmitted by the second terminal device in the resource pool, die first terminal device can learn the resource pool where the sidelink data is located, and determine the target receiving power of the second terminal device according to the second information in the configuration information of the resource pool.

In another possible design of the present application, the target receiving power of the second terminal device may be acquired from a third terminal device, and the third terminal device may be a terminal device in the communication group where the first terminal device and the second terminal device are located. The third terminal device has an ability to allocate, manage, or coordinate transmission resources of other terminal devices in the communication group. In an embodiment, the third terminal device may configure a target receiving power value of each terminal device in the communication group. For example, the third terminal device may configure the target receiving power of each terminal device in the communication group through SCI or sidelink RRC signaling. Therefore, in the embodiment, each first terminal device can directly acquire the second information for determining the target receiving power of the second terminal device from the third terminal device.

Exemplarily, in any of the foregoing possible designs, the aforementioned second information may include arty one of the following items:
- quantized power information of the target receiving power of the second terminal device;
- a power level identifier corresponding to the target receiving power of the second terminal device;
- a difference between the target receiving power of the second terminal device and a second power;
- where the second power is in any one of the following forms: a maximum transmitting power of the second terminal device, a pre-configured power value, and a power value determined by the second terminal device. Specifically, the difference between the target receiving power and the second power is quantized, and the quantized information is transmitted to the first terminal device through the second n formation.

Various expression forms oldie second information are similar to expression forms of the first information. For a specific implementation, reference may be made to the foregoing introduction of the first information, which will not be repeated herein. In the same way, expression forms of the second power are also similar to expression forms or possible values of the above-mentioned first power, and will not be repeated herein.

Exemplarily, following steps 72 to 74 may be performed for any one of at least two first terminal devices.

Step 72: each first terminal device acquires the above-mentioned indication information according to the received sidelink data.

In an embodiment, in the embodiments of the present application, when the second terminal device transmits sidelink data through a sidelink, each first terminal device can acquire the indication information by analyzing the sidelink data, where the indication information may indicate that each first terminal device determines the target transmitting power of feedback information corresponding to the sidelink data according to the indication information.

Step 73: each first terminal device determines the target transmitting power of the feedback information according to the acquired indication information.

In the embodiment, when each first terminal device acquires indication information carried in the sidelink data, and then may determine the target transmitting power of the feedback information according to the acquired indication information.

Exemplarily, for a first terminal device, the first terminal device may also detect a sidelink reference signal receiving power of the sidelink data (that is, the sidelink reference signal receiving power) by analyzing: the received sidelink data, and then jointly determine the target transmitting power of the feedback information according to the sidelink reference signal receiving power and the acquired indication information.

For example, the first terminal device may directly determine die target transmitting power of the feedback information according to an association relationship between the sidelink reference signal receiving power, the indication information, and the target receiving power of the second terminal, or may also firstly determine a pathless of the sidelink according to the sidelink reference signal receiving power and the indication information, and then determine the target transmitting power of the feedback information according to the pathloss of the sidelink and the second information included in the indication information. A specific implementation for determining the target transmitting power can be determined according to actual conditions, and will not be repeated herein. For a specific implementation principle of the step, reference may be made to a record of the embodiment shown in FIG. 8 below, which will not be repeated herein.

It is worth noting that, in the embodiments of the present application, when the target transmitting power of the feedback information determined according to the indication information is greater than a maximum transmitting power of the first terminal device, the first terminal device takes the maximum transmitting power of the first terminal device as an actual transmitting power of the feedback information.

Step 74: each first terminal device transmits the feedback information to the second terminal device with the determined target transmitting power.

In the embodiments of the present application, after each first terminal device determines the target transmitting power of the feedback information, when transmitting the feedback information to the second terminal device, the first terminal device can transmit the feedback information to the second terminal device with the target transmitting power.

Correspondingly, when multiple first terminal devices in the communication group all transmit feedback information to the second terminal device at their respective target transmitting powers, the second terminal device may receive feedback information transmitted by the above-mentioned at least two first terminal devices, and may then determine receiving status of the sidelink data of each first terminal device according to the feedback information transmitted by each first terminal device, and then determine whether retransmission is required.

It is worth noting that an execution order of foregoing steps is not limited in the embodiments of the present application, and can be determined according to actual conditions. For example, the first terminal device first acquires the second information used to determine the target receiving, power of the second terminal device, and then acquires the first information used to determine the transmitting power of the second terminal device.

According to the information transmission method provided by the embodiments of the present application, sidelink data transmitted by a second terminal device to at least two first terminal devices carries indication information, and the indication information is used to determine a target transmitting power of feedback information corresponding to the sidelink data, in this way, each first terminal device can determine the target transmitting power of the feedback information based on the indication information, and transmit the feedback information to the second terminal device with the target transmitting power, that is, in the technical solution, powers of the feedback information transmitted by each first terminal device reaching the second terminal device are caused to be similar, thereby avoiding a problem of failure in detection of the feedback information caused by the fact that the feedback information of a receiving terminal which is closer to a transmitting terminal may cover the feedback information of the receiving terminal which is farther away from the transmitting terminal.

Figure 8:
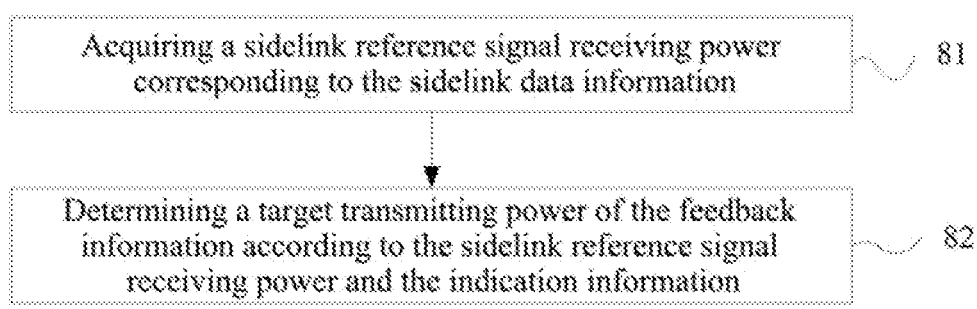
FIG. 8 is an interaction schematic diagram of Embodiment 2 of an information transmission method provided by an embodiment of the present application.

Exemplarily, on the basis of the foregoing embodiment, FIG. 8 is an interaction schematic diagram of Embodiment 2 of an information transmission method provided by an embodiment of the present application. As shown in FIG. 8, in the embodiment, for each first terminal device, the above step 73 can be implemented through the following steps:

step 81: acquiring a sidelink reference signal receiving power corresponding to the sidelink data.

In the embodiment, each first terminal device can measure a receiving power of a reference signal (reference signal, RS) in the sidelink data according to the sidelink data (for example, PSCCH or PSSCH), thereby determining the sidelink reference signal receiving power (sidelink reference signal receiving power, SL-RSRP) of the sidelink data.

Step 82: determining a target transmitting power of the feedback information according to the sidelink reference signal receiving power and the indication information.

Exemplarily, each first terminal device may acquire first information (for example, the indication information includes the first information), and determine the transmitting power of the second terminal device according to the first information; each first terminal device may acquire second information (for example, the indication information includes the second information), and determine the target receiving power of the second terminal device according to the second information.

As an example, in the embodiment, the first terminal device may directly determine the target transmitting power according to the determined transmitting power of the second terminal device, the target receiving power, and the sidelink reference signal receiving power SL-RSRP. Exemplarily, when an association relationship among the transmitting power of the second terminal device, the target receiving power, and the sidelink reference signal receiving power is preset in the first terminal device, the first: terminal device can directly determine the target transmitting power of the feedback information.

As another example, step 82 can be implemented through the following steps:

A 1: determining a path loss of the sidelink according to the sidelink reference signal receiving power and the first information.

Exemplarily, in the embodiment, the first terminal device may determine the transmitting power of the second terminal device according to the first information, and then determine the path loss of the sidelink according to the sidelink reference signal receiving power and the transmitting power of the second terminal device.

Specifically, the first terminal device may determine the transmitting power of the second terminal device according to the acquired sidelink reference signal receiving power and quantized power information of the transmitting power of the second terminal device, and may also determine the transmitting power of the second terminal device according to power level identifiers corresponding to the acquired sidelink reference signal receiving power and the transmitting power of the second terminal device, and may also be determine the transmitting power of the second terminal device according to the sidelink reference signal receiving power and a difference between the transmitting powers of the second terminal device and the first power. The specific determining method can be determined according to actual situations, and will not be repeated herein.

In the embodiment, the first terminal device may also perform filtering processing on the sidelink reference signal receiving power to obtain filtered sidelink reference signal receiving power.

Specifically, the first terminal device may acquire multiple SL-RSRPs and perform filtering processing on the acquired multiple SL-RSRPs. Correspondingly, the first terminal device may determine the path loss of the sidelink according to the filtered sidelink reference signal receiving power and the transmitting power of the second device, thereby improving the accuracy of the measurement.

A2: determining the target transmitting power of the feedback information according to the path loss of the sidelink and the second information.

In the embodiments of the present application, the first terminal device can estimate the path loss of the sidelink between the second terminal device and the first terminal device according to the determined transmitting power of the second terminal device and the acquired sidelink reference signal receiving power, and then determine the target transmitting power of the feedback information according to the path loss of the sidelink and the target receiving power of the second terminal device.

According to the information transmission method provided in the embodiments of the present application, a sidelink reference signal receiving power corresponding to sidelink data is acquired, a target transmitting power of feedback information is determined according to the sidelink reference signal receiving power and indication information. In this technical solution, the target transmitting power of the feedback information can be determined accurately, thus causing powers of the feedback information reaching the second terminal device to be similar, and avoiding a coverage problem between the feedback information of different first terminal devices.

Figure 9:
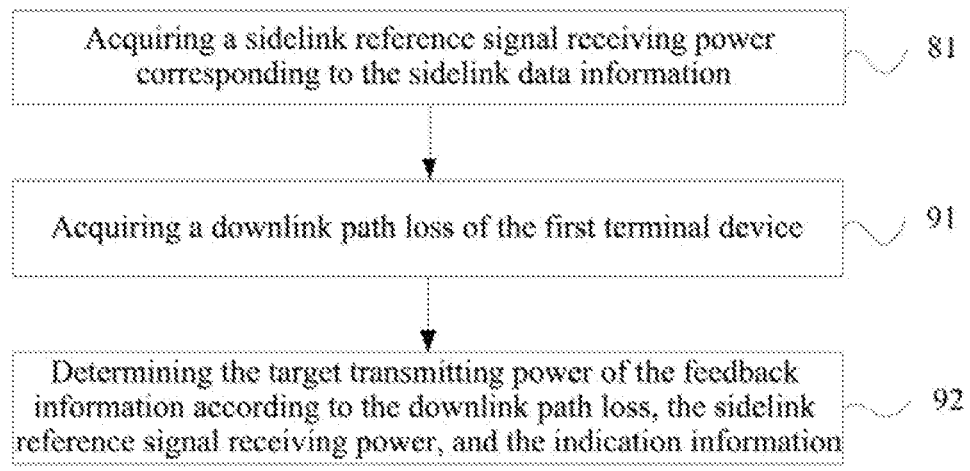
FIG. 9 is a schematic flowchart of Embodiment 3 of an information transmission method provided by an embodiment of the present application.

Exemplarily, on the basis of the foregoing embodiment, FIG. 9 is a schematic flowchart of Embodiment 3 of an information transmission method according to an embodiment of the present application. As shown in FIG. 9, in the embodiment, for each first terminal device, the information transmission method further includes the following steps:

step 91: acquiring a downlink path loss of the first terminal device.

In an embodiment, this step may be after step 81, after acquiring the sidelink reference signal receiving power corresponding to the sidelink data, if sidelink transmission between the first terminal device and a second terminal device and uplink transmission between the first terminal device and a network device share a carrier, and then the first terminal device needs to consider interference caused by the sidelink transmission of the first terminal device on the uplink transmission of other terminals when determining the target transmitting power of the feedback information. Therfore, in the embodiment, it is also necessary to acquire the downlink path loss of the first terminal device.

Specifically, in the embodiment, the first terminal device acquires a receiving power of a reference signal RS in downlink data information by detecting the downlink data information transmitted by the network device, thereby determining the downlink reference signal receiving power, and the first terminal device then acquires a transmitting power of the downlink data information when being transmitted by the network device, and then determines the downlink path loss of the first terminal device according to the downlink reference signal receiving power and the transmitting power of the downlink data information.

Correspondingly, the above step 82 can be implemented through the following steps:

step 92: determining the target transmitting power of the feedback information according to the downlink path loss, the sidelink reference signal receiving power, and the indication information.

In an embodiment, in the embodiments of the present application, after acquiring the downlink path loss, each first terminal device determines the target transmitting power of the feedback information in combination with the acquired sidelink reference signal receiving power and the indication information mentioned above.

Specifically, this step can be implemented in the following forms.

B1: determining a first transmitting power according to the downlink path loss.

In the embodiment, each first terminal device may first determine a transmitting power based on the determined downlink path loss, where the transmitting power is referred to as a first transmitting power in the embodiment.

B2: determining a second transmitting power according to the sidelink reference signal receiving power and the indication information.

In an embodiment, in this step, the method in the embodiment shown in FIG. 7 and FIG. 8 can be used such that each first terminal device uses the sidelink reference 5 signal reception power and the indication information to determine a possible second transmitting power.

B3: determining the target transmitting power of the feedback information according to the first transmitting power, the second transmitting power, and a maximum transmitting power of the first terminal device.

Further, since an actual transmitting power of the first terminal device cannot exceed its maximum transmitting power, therefore, in the embodiment, after determining the first transmitting power, the second transmitting power and the maximum transmitting power of the first terminal device, each first terminal device can determine an optimal transmitting power from the same. Specifically, in order to avoid causing interference to uplink transmission, the target transmitting power of the feedback information determined based on the indication information cannot exceed the transmitting power determined according to the downlink path loss. It should be noted that the maximum transmitting power of the first terminal device may be a maximum transmitting power of a terminal device configured by the network.

Exemplarily, a minimum transmitting power among the first transmitting power, the second transmitting power, and the maximum transmitting power of the first terminal device is determined first, and then the minimum transmitting power is used as the target transmitting power of the feedback information.

For example, if the first transmitting power is P_dl, the second transmitting power is P_sl, and the maximum transmitting power of the first terminal device is P_max, then the target transmitting power of the feedback information P_fb=min(P_sl, P_dl, P_max).

According to the information transmission method provided by the embodiment of the present application, when determining the target transmitting power of the feedback information of the first terminal device, the downlink path loss of the first terminal device is acquired, and then the target transmitting power of the feedback information is determined according to the downlink path loss, the sirloin* reference signal receiving power and the indication information, thereby only solving a problem of failure in detection of the feedback information from the first terminal device that is farther away from the second terminal device in the prior art, but also avoiding interference on uplink transmission and improving user experience.

Figure 10:
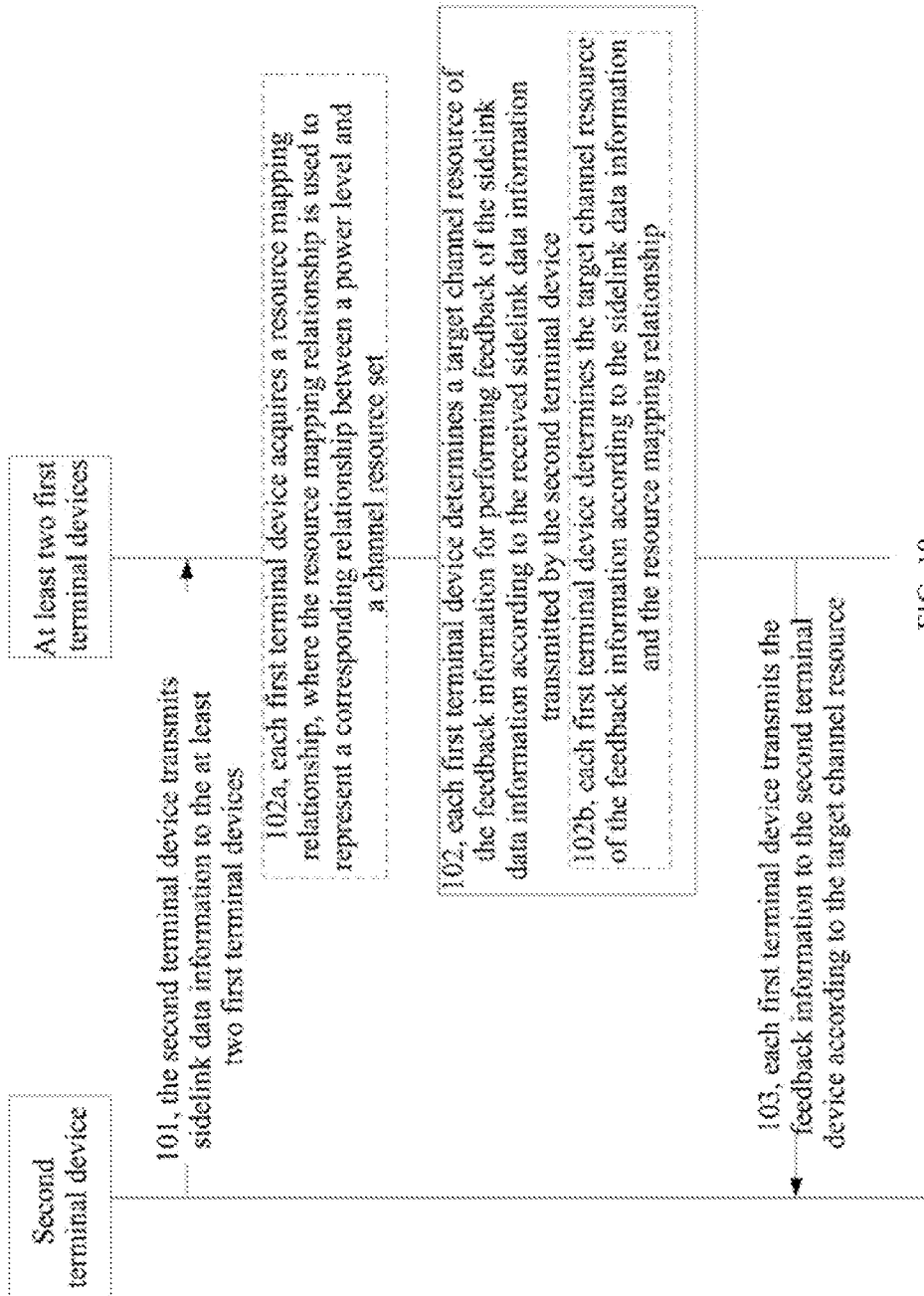
FIG. 10 is a schematic flowchart of Embodiment 4 of an information transmission method provided by an embodiment of the present application.

Exemplarily, in a possible design of the present application, FIG. 10 is a schematic flowchart of Embodiment 4 of an information transmission method provided by an embodiment of the present application. The embodiment shown in FIG. 10 is different from the method of the embodiment shown in FIG. 7 to FIG. 9. The embodiment shown in FIG. 7 to FIG. 9 is mainly that the first terminal device determines a target transmiting power of the feedback information for feedback based on the received indication information, and the embodiment shown in FIG. 10 is mainly that the first terminal device determines a target channel resource of the feedback information for feedback according to the received sidelink data, thereby causing channel resources for feedback information of different first terminal devices to be different, thus solving an interference or coverage problem of the feedback information.

Exemplarily, similar to a structure of the embodiment shown in FIG. 7, in the embodiment, for the purpose of description, a second terminal device communicates with at least two first terminal devices through sidelinks. Where each first terminal device of the at least two first terminal devices can receive the sidelink data transmitted by the second terminal device. In the same way, the embodiment is also applicable to the case where there is only one first terminal device.

Exemplarily, as shown in FIG. 10, in the embodiment, the information transmission method may include the following steps:

step 101: the second terminal device transmits sidelink data to the at least two first terminal devices.

In the embodiment, in a communication group, when the second terminal device needs to communicate with multiple first terminal devices in the communication group through the sidelinks, the second terminal device can transmit sidelink data to each first terminal device in the communication group by virtue of multicast.

In the embodiment, the second terminal device also transmits control information to the at least two first terminal devices through a PSCCH, and transmits data information to the at least two first terminal devices through a PSSCH.

The way in which the second terminal device transmits the sidelink data to the at least two first terminal devices is similar to that in the embodiment shown in FIG. 7, with a difference that the content carried in the control information is not limited in the embodiment of the present application.

Step 102: each first terminal device determines a target channel resource of the feedback information corresponding to the sidelink data according to the received sidelink data transmitted by the second terminal device.

Where the target channel resource is different from channel resources for transmitting feedback information by other first terminal devices to the second terminal device.

In an embodiment, in the embodiments of the present application, each first terminal device or a network device may divide a reference signal receiving power into multiple power levels, and each power level corresponds to a channel resource set, that is, the divided power levels are used for grouping transmission resources for the feedback information, and first terminal devices with different power levels transmit the feedback information in channel resource sets corresponding to power levels to Which they belong.

Exemplarily, in the embodiment, a corresponding relationship between ranges of the reference signal receiving power on the sidelink SL-RSRP and power levels may be as shown in Table 1. In an embodiment, the power level is an SL-RSRP level. Table 1 shows the corresponding relationship between SL-RSRP ranges and SL-RSRP levels.

| SL-RSRP level | SL-RSRP range |
| --- | --- |
| Level 0 | SL-RSRP < −130 dBm |
| Level 1 | −130 dBm <= SL-RSRP < −120 dBm |
| Level 2 | −120 dBm <= SL-RSRP < −110 dBm |
| Level 3 | −110 dBm <= SL-RSRP < −100 dBm |
| Level 4 | −100 dBm <= SL-RSRP < −90 dBm |
| Level 5 | −90 dBm <= SL-RSRP < −80 dBm |
| Level 6 | −80 dBm <= SL-RSRP < −70 dBm |
| Level 7 | SL-RSRP >= −70 dBm |

It is worth noting that a specific value of the SL-RSRP range corresponding to each power level can be determined according to actual conditions, which is not limited in the embodiment.

In the embodiment, different SL-RSRP levels correspond to different feedback channel transmission resource sets. Therefore, the first terminal device can acquire the SL-RSRP according to the acquired sidelink data, and then determine a target channel resource which is used to carry feedback information according to a power level to which the SL-RSRP belongs, where the feedback information is information used by the first terminal device to feed back whether the sidelink data is received correctly.

Exemplarily, in the embodiment, referring to FIG. 10, before the step 102, the method may further include the following steps:

step 102a: each first terminal device acquires a resource mapping relationship, where the resource mapping relationship is used to represent a corresponding relationship between a power level and a channel resource set.

Exemplarily, the power level is an SE-RSRP level.

In the embodiment, the resource mapping relationship that represents the corresponding relationship between the power level and the channel resource set is configured in each first terminal device. Therefore, when each first terminal device needs to transmit the feedback information, it can firstly acquire the resource mapping relationship.

In an embodiment, the resource mapping relationship may be pre-configured, configured by a network, or independently determined by a terminal. Therefore, the step can be implemented at least in the following ways:

implementation 1: each first terminal device receives the resource mapping relationship transmitted by the network device, where the resource mapping relationship is configured by the network device.

In the embodiment, the network device configures the resource mapping relationship for a communication group, and transmits the con figured resource mapping relationship to each terminal device (including the first terminal device and the second terminal device) in the communication group through network configuration information. Therefore, in the embodiment, each first terminal device can determine the resource mapping relationship according to the received network configuration information.

Implementation 2: each first terminal device acquires the resource mapping relationship pre-stored in the first terminal device.

In the embodiment, the resource mapping relationship is pre-configured inside the first terminal device, so that when each first terminal device needs to determine a channel resource of the feedback information, it can acquire the resource mapping relationship pre-stored in the first terminal device according to pre-configuration information.

Implementation 3, each first terminal device determines the resource mapping relationship according to a configuration rule pre-stored in the first terminal device; or, determines the resource mapping relationship according to a configuration rule received from the network device.

In the embodiment, as an example, each first terminal device determines a configuration rule used to represent a corresponding relationship between a power level and a channel resource set by negotiating or agreeing with other terminal devices in the communication group, and stores the configuration rule in the first terminal device. Therefore, in the embodiment, when the first terminal device needs to acquire the resource mapping relationship, it can directly determine the resource mapping relationship according to the pre-stored configuration rule.

As an example, the network device can set a configuration rule of the resource mapping relationship for a communication group and transmit the configuration rule to each terminal device in the communication group. Therefore, in the embodiment, when each first terminal device needs to acquire the resource mapping relationship, it can determine the resource mapping relationship according to the configuration rule received from the network device.

Correspondingly, the step 102 can be implemented through the following steps:

step 102b: each first terminal device determines the target channel resource of the feedback information according to the sidelink data and the resource mapping relationship.

Exemplarily, in the embodiment, when receiving the sidelink data transmitted by the second terminal device, the first terminal device first acquires the sidelink reference signal receiving power corresponding to the sidelink data, and then determines the target channel resource of the feedback information according to the power level to which the sidelink reference signal receiving power belongs and the resource mapping relationship.

Specifically, in the embodiment, the first terminal device determines the channel resource set corresponding to the power level to which the sidelink reference signal receiving power belongs according to the power level of the sidelink reference signal receiving power and the resource mapping relationship, and determines the target channel resource of the feedback information according to the channel resource set.

In the embodiment, when acquiring the sidelink data, the first terminal device first acquires the sidelink reference signal receiving power corresponding to the sidelink data, determines the power level to which the sidelink reference signal receiving power belongs, and then determines the channel resource set corresponding to the power level according to the power level and the resource mapping relationship, and finally determines the target channel resource of the feedback information based on resource utilization information (for example, a position and a size of free resource) in each channel resource set.

Exemplarily, in the embodiment, the channel resources of the feedback information corresponding to different power levels are different, which may be different frequency domain resources, different time domain resources, or different code domain resources, and different first terminal devices use channel resources corresponding to different power levels, thus making interference among terminals in the same communication group very low.

For example, a channel resource corresponding to a power level 0 is a subband N, a channel resource corresponding to a power level 1 is a subband N+1, a channel resource corresponding to a power level 2 is a subband N+2, and so an. A subband includes multiple consecutive physical resource blocks (physical resource block, PRB). Therefore, terminal devices with the same power level can also use different PRBs in the subband corresponding to the power level, or use different code domain resources, thus avoiding a problem of information coverage.

Step 103: each first terminal device transmits the feedback information to the second terminal device according to the target channel resource.

In the embodiments of the present application, after determining the target channel resource of the feedback information corresponding to the sidelink data, the first terminal device may transmit the feedback information to the second terminal device an the target channel resource.

It is worth noting that when multiple first terminal devices located in the same communication group receive the sidelink data transmitted by the second terminal device, they can all execute solutions in step 102 and step 103 described above, so as to achieve the transmission of the feedback information in the case of avoiding, related interference.

Correspondingly, when multiple first terminal devices in the communication group transmit feedback information to the second terminal device on various target channel resources, the second terminal device may receive the feedback information transmitted by the at least two first terminal devices, then determine reception status of the sidelink data of each first terminal device according to the feedback information transmitted by each first terminal device, and then determine whether retransmission is required.

According to the information transmission method provided by the embodiment of the present application, a second terminal device transmits sidelink data to at least two first terminal devices, and each first terminal device determines a target channel resource of feedback information corresponding to the sidelink data according to the received sidelink data transmitted by the second terminal device, and then transmits the feedback information to the second terminal device according to the target channel resource. In the technical solution, by determining the target channel resource of the feedback information corresponding to the sidelink data by each first terminal device, since the interference between different channel resources is very low, thus avoiding a problem of failure in detection of the feedback information fed hack by the first terminal device which is farther from the second terminal device.

Figure 11:
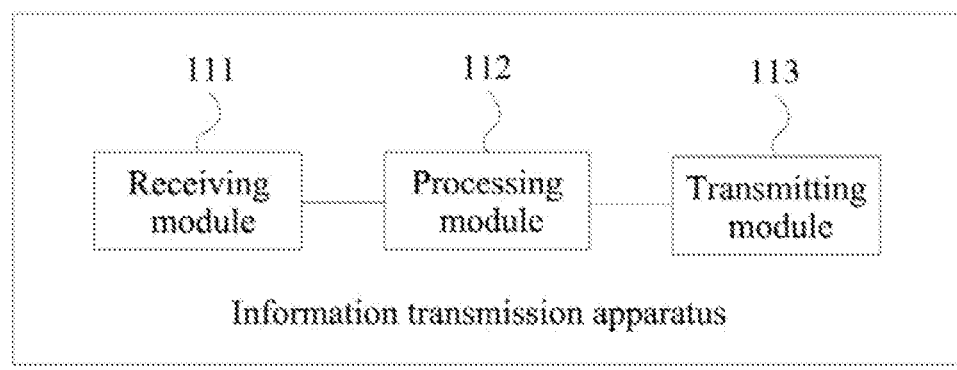
FIG. 11 is a schematic structural diagram of Embodiment 1 of an information transmission apparatus provided by an embodiment of the present application.

FIG. 11 is a schematic structural diagram of Embodiment 1 of an information transmission apparatus according to an embodiment of the present application. The apparatus may be integrated in a first terminal device, or may be the first terminal device. As shown in FIG. 11, the apparatus may include: a receiving module 111, a processing, module 112, and a transmitting module 113.

Where the receiving module 111 is configured to receive sidelink data transmitted by a second terminal device, where the sidelink data carries indication information, and the indication information is used to determine a target transmitting power of feedback information corresponding to the sidelink data;

the processing module 112 is configured to determine the target transmitting power of the feedback information according to the indication information, and the transmitting module 113 is configured to transmit the feedback information to the second terminal device with the target transmitting power.

In a possible design of an embodiment of the present application, the indication information includes first information, and the first information is used to determine a transmitting power of the second terminal device.

In another possible design of an embodiment of the present application, the receiving module 111 is further configured to receive second information transmitted by a network device, where the second information is used to determine a target receiving power of the second terminal device.

In another possible design of an embodiment of the present application, the receiving module 111 is further configured to receive configuration information of a resource pool transmitted by a network device, where the configuration information of the resource pool includes second information, and the second information is used to determine a target receiving power of the second terminal device.

In another possible design of an embodiment of the present application, the indication information further includes: second information, and the second information is used to determine a target receiving power of the second terminal device.

In an embodiment, the first information includes any one of the following items:
 quantized power information of the transmitting power of the second terminal device, a power level identifier corresponding to the transmitting power of the second terminal device, and a difference between the transmitting power of the second terminal device and a first power;
 where the first power is in any one of the following forms: a maximum transmitting power of the second terminal device, a pre-configured power value, and a power value determined by the second terminal device.

In an embodiment, the second information includes any one of the following items:
 quantized power information of the target receiving power of the second terminal device, a power level identifier corresponding to the target receiving power of the second terminal device, and a difference between the target receiving power of the second terminal device and a second power;
 Where the second power is in any one of the following forms: a maximum transmitting power of the second terminal device, a pre-configured power value, and a power value determined by the second terminal device.

In another possible design of an embodiment of the present application, the processing module 112 is specifically configured to acquire a sidelink reference signal receiving power corresponding to the sidelink data, and determine the target transmitting power of the feedback information according to the sidelink reference signal receiving power and the indication Information.

In an embodiment, the processing module 112 is further configured to acquire a downlink path loss of the first terminal device by a device;
 correspondingly, the processing module 112 is specifically configured to determine the target transmitting power of the feedback information according to the downlink path loss, the sidelink reference signal receiving, power, and the indication information.

In an embodiment, the processing module 112 is specifically configured to determine a first transmitting power according to the downlink path loss, and determine a second transmitting power according to the sidelink reference signal receiving power and the indication information, and determine the target transmitting power of the feedback information according to the first transmitting power, the second transmitting power, and a maximum transmitting power of the first terminal device.

In an embodiment, the processing module 112 is specifically configured to determine a minimum transmitting power among the first transmitting power, the second transmitting power, and the maximum transmitting power of the first terminal device, and take the minimum transmitting power as the target transmitting power of the feedback information.

The apparatus provided in the embodiment is used to implement: the technical solutions on the first terminal device side in the embodiments shown in FIG. 7 to FIG. 9. Its implementation principles and technical effects are similar. Sidelink data transmitted by a second device to a first device carries indication information, and the indication information is used to determine a target transmitting power of feedback information corresponding to the sidelink data, in this way, the first terminal device can determine the target transmitting power of the feedback information based on the indication information, so that powers of the feedback information transmitted by each first terminal device reaching the second terminal device are similar, thereby solving a problem of failure in detection of the feedback information caused by the fact that feedback information of a receiving terminal which is closer to a transmitting terminal may cover feedback information of a receiving terminal which is farther away from the transmitting terminal.

Figure 12:
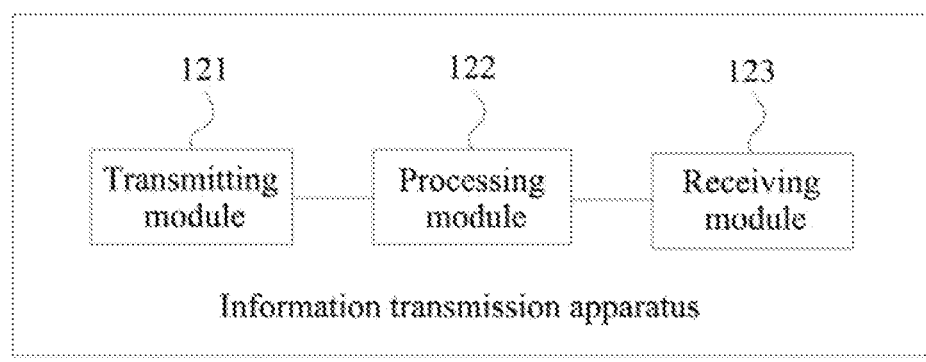
FIG. 12 is a schematic structural diagram of Embodiment 2 of an information transmission apparatus provided by an embodiment of the present pplication.

FIG. 12 is a schematic structural diagram of Embodiment 2 of an information transmission apparatus according to an embodiment of the present application. The apparatus may be integrated m a second terminal device, or may be the second terminal device. As shown in FIG. 12, the apparatus may include: a transmuting module 121, a processing module 122, and a receiving module 123.

Where the transmitting module 121 is con figured to transmit sidelink data to at least two first terminal devices, where the sidelink data carries indication information, and the indication information is used to determine a target transmitting, power of feedback information corresponding to the sidelink data; and the processing module 122 is configured to receive, through the receiving module 123, the feedback information transmitted by the at least two first terminal devices.

In a possible design of an embodiment of the present application, the indication information includes: first information, and the fast information is used to determine a transmitting power of the second terminal device.

In another possible design of an embodiment of the present application, the indication information further includes: second information, and the second information is used to determine a target receiving power of the second terminal device.

In an embodiment, the first information includes any one of the following items:

quantized power information of a transmitting power of the second terminal device, a power level identifier corresponding to the transmitting power of the second terminal device, and a difference between the transmitting power of the second terminal device and a first power;

Where the first power is in any one of the following forms: a maximum transmitting power of the second terminal device, a pre-configured power value, and a power value determined by the second terminal device.

In an embodiment, the second information includes any one of the following items:

quantized power information of a target receiving power of the second terminal device, a power level identifier corresponding to the target receiving power of the second terminal device, and a difference between the target receiving power of the second terminal device and a second power;

where the second power is in any one of the following forms: a maximum transmitting power of the second terminal device, a pre-configured power value, and a power value determined by the second terminal device.

In another possible design of an embodiment of the present application, the receiving module 123 is further configured to receive the second information transmitted by the network device, where the second information is pre-configured by the network device.

The apparatus provided in the embodiment is used to implement the technical solutions on the second terminal device side in the embodiments shown in FIG. 7 to FIG. 9.

Figure 13:
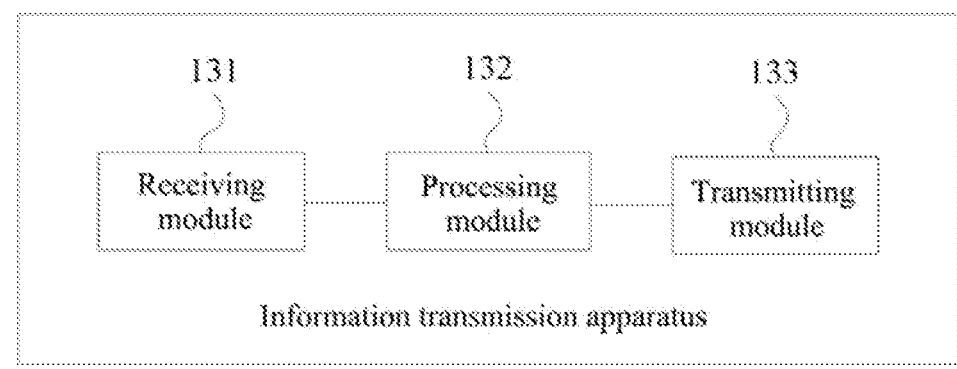
FIG. 13 is a schematic structural diagram of Embodiment 3 of an information transmission apparatus provided by an embodiment of the present application.

FIG. 13 is a schematic structural diagram of Embodiment 3 of an information transmission apparatus according to an embodiment of the present application. The apparatus may be integrated in a first terminal device, or may be the first terminal device. As shown in FIG. 13, the apparatus may include: a receiving module 131, a processing module 132, and a transmitting module 133.

Where the receiving module 131 is configured to receive sidelink data transmitted by a second terminal device;
the processing module 132 is configured to determine a target channel resource of feedback information corresponding to the sidelink data; and
the transmitting module 133 is configured to transmit the feedback information to the second terminal device according to the target channel resource.

In a possible design of an embodiment of the present application, the processing module 132 is further configured to acquire a resource mapping relationship, where the resource mapping relationship is used to represent a corresponding relationship between a power level and a channel resource set;
correspondingly, the processing module 132 is specifically configured to determine the target channel resource of the feedback information according to the sidelink data and the resource mapping relationship.

In an embodiment, the processing module 132 is specifically used to acquire a sidelink reference signal receiving power corresponding to the sidelink data, and determine the target channel resource of the feedback information according to a power level to which the sidelink reference signal receiving power belongs and the resource mapping relationship.

In an embodiment, the processing module 132 is specifically configured to determine a channel resource set corresponding to the power level to which the sidelink signal receiving power belongs according to the power level to which the sidelink reference signal receiving power belongs and the resource mapping relationship, and determine the target channel resource of the feedback information according to the channel resource set.

In another possible design of an embodiment of the present application, the processing module 132 is specifically configured to receive, through the receiving module 131, the resource mapping relationship transmitted by a network device, where the resource mapping relationship is configured by the network device.

In another possible design of an embodiment of the present application, the processing module 132 is specifically configured to acquire the resource mapping relationship pre-stored in the first terminal device.

In another possible design of an embodiment of the present application, the processing module 132 is specifically configured to determine the resource mapping relationship according to a configuration rule pre-stored in the first terminal device; or the processing module 132 is specifically configured to determine the resource mapping relationship according to a configuration rule received from a network device.

The apparatus provided in the embodiment is used to implement the technical solution on the first terminal device side in the embodiment shown in FIG. 10, and its implementation principles and technical effects are similar. A first terminal device determines a target channel resource of feedback information corresponding to sidelink data according to sidelink data transmitted by a second terminal device, and transmits the feedback information to the second terminal device according to the target channel resource. That is, in the solution, by determining the target channel resource of the feedback information corresponding to the sidelink data by each first terminal device, since interference between different channel resources is very low, thereby avoiding a problem of failure in detection of the feedback information fed back by the first terminal device which is farther away from the second terminal device.

It should be noted that a division of each module of the above apparatus is only a division of logical functions, and may be fully or partially integrated into a physical entity in actual implementations, or may be physically separated. And these modules can all be implemented in a form of software called by processing elements; or can also be implemented in a form of hardware; or part of the modules can be implemented in a form of software called by processing elements, and part of the modules can be implemented in a form of hardware. For example, the processing module may be a separately established processing element, or it may also be integrated in a chip of the above apparatus for implementation. In addition, it may also be stored in a memory of the above apparatus in a form of program codes, a certain processing unit in the above apparatus calls the program codes to execute functions of the above determining module. The implementations of other modules are similar. In addition, all or part of these modules can be integrated together or implemented independently. The processing element described herein may be an integrated circuit with signal processing capabilities. In an implementation process, each step of the above method or each of the above modules can be completed by an integrated logic circuit of hardware in the processor element or instructions in a form of software. For example, the above modules may be one or more integrated circuits configured to implement the above methods, such as: one or more application specific integrated circuits (application specific integrated circuit, ASIC), or one or more microprocessors (digital signal processor, DSP), or, one or more field programmable gate arrays (field programmable gate array, FPGA), etc. For another example, when one of the above modules is implemented in a form of scheduling program codes by the processing element, the processing element may be a general-purpose processor, such as a central processing unit (central processing unit, CPU) or other processors that can call program codes. For another example, these modules can be integrated together and implemented in a form of a system-on-a-chip (system-on-a-chip, SOC).

In the above embodiments, it may be implemented fully or partially in software, hardware, firmware, or any combination thereof. When implemented in software, it can be implemented fully or partly in a form of a computer program product. The computer program product includes one or more computer instructions. When the computer program instructions are loaded and executed on a computer, processes or functions described in the embodiments of the present application are generated fully or partly. The computer may be a general purpose computer, a special purpose computer, a computer network, or other programmable apparatuses. The computer instructions may be stored in a computer-readable storage medium, or transmitted from one computer-readable storage medium to another computer-readable storage medium. For example, the computer instructions may be transmitted from a website, a computer, a server, or a data center to another website site, a computer, a server or a data center in a wired manner (such as a coaxial cable, an optical fiber, a digital subscriber line (DSL)) or in a wireless manner (such as infrared, wireless, microwave, etc.). The computer-readable storage medium may be any available medium that can be accessed by a computer or a data storage device such as a server or a data center integrated with one or more available mediums. The available medium may be a magnetic medium (for example, a floppy disk, a hard disk, and a magnetic tape), an optical medium (for example, a DVD), or a semiconductor medium (for example, a solid state disk (SSD)), etc.

Figure 14:
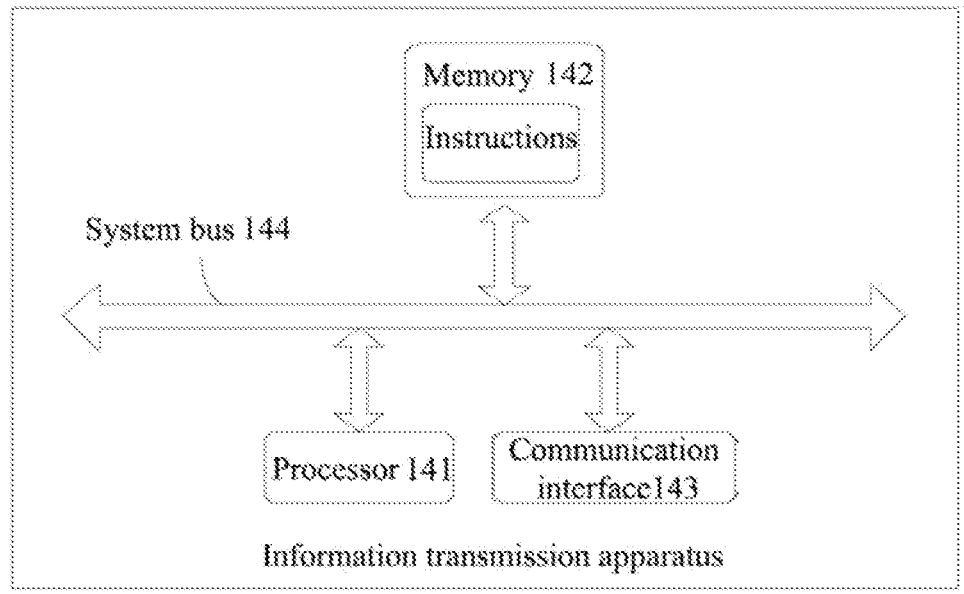
FIG. 14 is a schematic structural diagram of Embodiment 4 of an information transmission apparatus provided by an embodiment of the present application.

FIG. 14 is a schematic structural diagram of Embodiment 4 of an information transmission apparatus according to an embodiment of the present application. The apparatus can be integrated in a first terminal device, and can also be implemented by the first terminal device. As shown in FIG. 14, the apparatus may include: a processor 141, a memory 142, a communication interface 143, and a system bus 144. The memory 142 and the communication interface 143 are connected to the processor 141 through the system bus 144, to complete mutual communication, the memory 142 is used to store computer-executed instructions, the communication interface 143 is used to communicate with other devices, and the processor 141 executes the computer-executed instructions to achieve the implementation schemes of the first terminal device in the method embodiments shown in FIG. 7 to FIG. 9.

Figure 15:
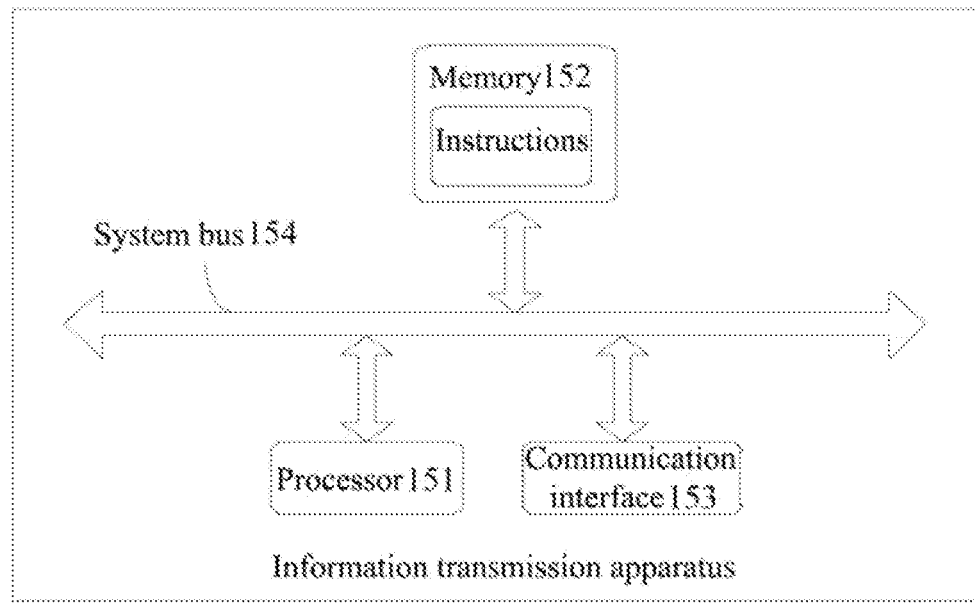
FIG. 15 is a schematic structural diagram of Embodiment 5 of an information transmission apparatus provided by an embodiment of the present application.
Figure 16:
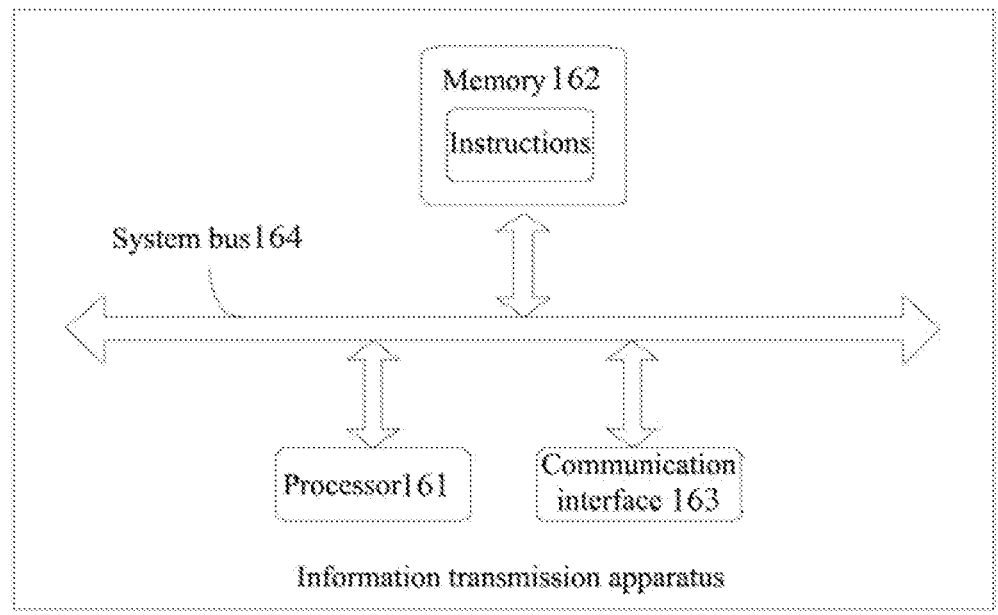
FIG. 16 is a schematic structural diagram of Embodiment 6 of an information transmission apparatus provided by an embodiment of the present application.

FIG. 15 is a schematic structural diagram of Embodiment 5 of an information transmission apparatus according to an embodiment of the present application. The apparatus can be integrated in a second terminal device, and can also be implemented by the second terminal device. As shown in FIG. 15, the apparatus may include: a processor 151, a memory 152, a communication interface 153, and a system bus 154. The memory 152 and the communication interface 153 are connected to the processor 151 through the system bus 154, to complete mutual communication, the memory 152 is configured to store computer-executable instructions, the communication interface 153 is configured to communicate with other devices, and the processor 151 executes the computer-executable instructions to achieve the implementation schemes of the second terminal device in the method embodiments shown in FIG. 7 to FIG. 9, FIG. 16 is a schematic structural diagram of Embodiment 6 of an information transmission apparatus according to an embodiment of the present application. The apparatus can be integrated in a first terminal device, and can also be implemented by the first terminal device. As shown in FIG. 16, the apparatus may include: a processor 161, a memory 162, a communication interface 163, and a system bus 164. The memory 162 and the communication interface 163 are connected to the processor 161 through the system bus 164, to complete mutual communication, the memory 162 is configured to store computer-executed instructions, the communication interface 163 is configured to communicate with other devices, and the processor 161 executes the computer-executed instructions to implement the implementation schemes of the first terminal device M method embodiments shown in FIG. 10.

The system bus mentioned in FIG. 14 to FIG. 16 may be a peripheral component interconnect (peripheral component interconnect, PCI) bus or an extended industry standard architecture (extended industry standard architecture, EISA) bus, ect. The system bus can be divided into an address bus, a data bus, a control bus, ect. For ease of representation, the bus is represented by only one thick line in the figure, but it does not mean that there is only one bus or one type of bus. The communication interface is configured to realize communication between a database access apparatus and other devices (such as a client, a read-write database and a read-only database). The memory may include a random access memory (random access memory, RAM), and may also include a non-volatile memory (non-volatile memory), for example, at least one disk memory.

The above processor may be a general-purpose processor, including a central processing unit CPU, a network processor (network processor, NP), etc.; it may also be a digital signal processor DSP, an application specific integrated circuit ASIC, a field programmable gate array FPGA or other programming logic devices, a discrete gate or a transistor logic device, a discrete hardware component.

In an embodiment, an embodiment of the present application provides a storage medium, where the storage medium stores instructions which, when running on a computer, cause the computer to execute the implementation schemes of the first terminal device in the method embodiments shown in above FIG. 7 to FIG. 9.

In an embodiment, an embodiment of the present application further provides a storage medium, where the storage medium stores instructions which, when running on a computer, cause the computer to execute the implementation schemes of the second terminal device in the method embodiments shown in above FIG. 7 to FIG. 9.

In an embodiment, an embodiment: of Lite present application further provides a storage medium, where the storage medium stores instructions which, when running on a computer, cause the computer to execute the implementation schemes of the first terminal device in the method embodiments shown in above FIG. 10.

In an embodiment, an embodiment of the present application further provides a chip for executing instructions, where the chip is configured to execute the implementation schemes of the first terminal device in the method embodiments shown in above FIG. 7 to FIG. 9.

In an embodiment, an embodiment of the present application further provides a chip for executing instructions, where the chip is configured to execute the implementation schemes of the second terminal device in the method embodiments shown in above FIG. 7 to FIG. 9.

In an embodiment, an embodiment of the present application further provides a chip for executing instructions, where the chip is configured to execute the implementation schemes of the first terminal device in the method embodiments shown in above FIG. 10.

An embodiment of the present application also provides a program product, the program product includes a computer program, the computer program is stored in a storage medium, at least one processor can read the computer program from the storage medium, and the at least one processor, when executing the computer program, can implement the implementation schemes of the first terminal device in the method embodiments shown in above FIG. 7 to FIG. 9.

An embodiment of the present application further provides a program product, the program product includes a computer program, the computer program is stored in a storage medium, at least one processor can read the computer program from the storage medium, and the at least one processor, when executing the computer program, can implement the implementation schemes of the second terminal device in the method embodiments shown in above FIG. 7 to FIG. 9.

An embodiment of the present application further provides a program product, the program product includes a computer program, the computer program is stored in a storage medium, at least one processor can read the computer program from the storage medium, and the at least one processor, when executing the computer program, can implement the implementation scheme the first terminal device in the method embodiments shown in above FIG. 10.

Figure 17:
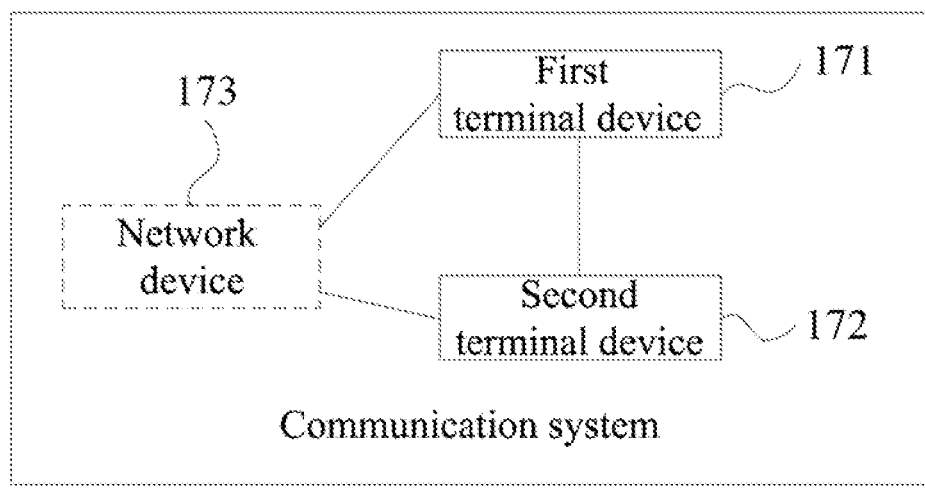
FIG. 17 is a schematic structural diagram of an embodiment of a communication system provided by an embodiment of the present application.

FIG. 17 is a schematic structural diagram of an embodiment of a communication system provided by an embodiment of the present application. As shown in FIG. 17, the communication system may include: a first terminal device 171 and a second terminal device 172.

Where the first terminal device 171 may be an information transmission apparatus of the embodiments shown in FIG. 7 to FIG. 9, and the second terminal device 172 may be an information transmission apparatus of the embodiments shown in FIG. 7 to FIG. 9. Or, the first terminal device 171 may be the information transmission apparatus of the embodiment shown in FIG. 10, and the second terminal device 172 may be the information transmission apparatus of the embodiment shown in FIG. 10.

Exemplarily, the communication system may be referred to as an Internet of Vehicles system or a D2D system.

In an embodiment, the communication system of the present application may further include: a network device 173. The network device 173 may provide services for the first terminal device 171 and/or the second terminal device 172.

In the embodiment, for a specific implementation of the first terminal device. 171 and the second terminal device 172, reference may be made to descriptions in the above embodiment, which will not described herein again.

In the present application, "at least one" refers to one or more, and "multiple" refers to two or more. "And/or" describes an association relationship of associated objects, indicating that there can be three relationships, for example, A and/or B, which can mean: A exists alone, A and B exist at the same time, and B exists alone, where A, B can be singular or plural. A character "/" generally indicates that the associated objects before and after are in an "or" relationship; in a formula, the character "S" indicates that the associated objects before and after are in a "division" relationship. "At least one of the following items" or similar expressions refers to any combination of these items, including any combination of a single item or a plurality of items. For example, at least one of a, b, or c can mean: a, b, c, a-b, a-c, b-c, or a-b-c, where a, b, and c can be single or multiple. It can be understood that the various numerical numbers involved in the embodiments of the present application are only distinction for ease of description, and are not used to limit the scope of the embodiments of the present application.

It can be understood that, in the embodiments of the present application, the sizes of sequence numbers of the above processes do not mean an execution order. Execution order of each process should be determined by its function and internal logic, and should not be constituted any limitation for the implementation of the present application.

What is claimed is:

1. An information transmission method applied to a first terminal device, the method comprising:
receiving sidelink data transmitted by a second terminal device, wherein the sidelink data carries indication information, and the indication information is used to determine a target transmitting power of feedback information corresponding to the sidelink data;
determining the target transmitting power of the feedback information according to the indication information; and
transmitting the feedback information to the second terminal device with the target transmitting power;
wherein the indication information comprises first information, and the first information is used to determine a transmitting power of the second terminal device;
wherein the method further comprises:
receiving configuration information of a resource pool transmitted by a network device, wherein the configuration information of the resource pool comprises second information, and the second information is used to determine a target receiving power of the second terminal device;
wherein the second information comprises a difference between the target receiving power of the second terminal device and a second power, wherein the second power is in any one of the following forms: a maximum transmitting power of the second terminal device, a pre-configured power value and a power value determined by the second terminal device;
wherein the determining the target transmitting power of the feedback information according to the indication information comprises:
acquiring multiple sidelink reference signal receiving powers corresponding to the sidelink data;
performing filtering processing on the multiple sidelink reference signal receiving powers to obtain a filtered sidelink reference signal receiving power;
determining a transmitting power of the second terminal device according to the first information;
determining a path loss of the sidelink between the second terminal device and the first terminal device according to the filtered sidelink reference signal receiving power and the transmitting power of the second device; and
determining the target transmitting power of the feedback information according to the path loss of the sidelink and the second information.

2. The method according to claim 1, wherein the first information comprises any one of the following items:
quantized power information of the transmitting power of the second terminal device, a power level identifier corresponding to the transmitting power of the second terminal device, and a difference between the transmitting power of the second terminal device and a first power;
wherein the first power is in any one of the following forms: a maximum transmitting power of the second terminal device, a pre-configured power value, and a power value determined by the second terminal device.

3. An information transmission method applied to a second terminal device, the method comprising:
transmitting sidelink data to at least two first terminal devices, wherein the sidelink data carries indication information, and the indication information is used to determine a target transmitting power of feedback information corresponding to the sidelink data; and
receiving feedback information transmitted by the at least two first terminal devices;
wherein the indication information comprises first information, and the first information is used to determine a transmitting power of the second terminal device;
wherein a target receiving power of the second terminal device is determined based on second information comprised in configuration information of a resource pool that is sent from a network device to the at least two first terminal devices;
wherein the second information comprises a difference between the target receiving power of the second terminal device and a second power, wherein the second power is in any one of the following forms: a maximum transmitting power of the second terminal device a pre-configured power value and a power value determined by the second terminal device;
wherein the target transmitting power of the feedback information is determined according to a path loss of a sidelink between the second terminal device and the first terminal device and the second information, the path loss of the sidelink is determined according to a filtered sidelink reference signal receiving power and a transmitting power of the second device, the filtered sidelink reference signal receiving power is obtained by performing filtering processing on multiple sidelink reference signal receiving powers corresponding to the sidelink data, and the transmitting power of the second terminal device is determined according to the first information.

4. An information transmission apparatus, wherein the apparatus is applied to a first terminal device, and the apparatus comprises:
at least one processor,
an input interface connected with the at least one processor; and
a memory connected with the at least one processor and configured to store instructions;
wherein the instructions, when executed by the at least one processor, cause the at least one processor to execute the method according to claim 1.

* * * * *